United States Patent
Jiao et al.

(10) Patent No.: US 12,022,309 B2
(45) Date of Patent: Jun. 25, 2024

(54) COMMUNICATION METHOD AND APPARATUS

(71) Applicant: HUAWEI TECHNOLOGIES CO., LTD., Guangdong (CN)

(72) Inventors: Shurong Jiao, Shanghai (CN); Yongxia Lyu, Shanghai (CN); Fei Gao, Shanghai (CN); Meng Hua, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 382 days.

(21) Appl. No.: 17/510,924

(22) Filed: Oct. 26, 2021

(65) Prior Publication Data

US 2022/0046452 A1  Feb. 10, 2022

Related U.S. Application Data

(63) Continuation of application No. PCT/CN2020/084313, filed on Apr. 10, 2020.

(30) Foreign Application Priority Data

Apr. 28, 2019 (CN) .......................... 201910348322.8

(51) Int. Cl.
   *H04W 24/08* (2009.01)
   *H04W 72/0446* (2023.01)
   (Continued)

(52) U.S. Cl.
   CPC ....... *H04W 24/08* (2013.01); *H04W 72/0446* (2013.01); *H04W 72/23* (2023.01); *H04W 72/56* (2023.01)

(58) Field of Classification Search
   CPC ..... H04W 24/08; H04W 72/56; H04W 72/23; H04W 72/0446
   See application file for complete search history.

(56) References Cited

U.S. PATENT DOCUMENTS

| | | | |
|---|---|---|---|
| 2013/0336263 A1* | 12/2013 | Wang .................... | H04L 5/0053 370/329 |
| 2019/0081820 A1* | 3/2019 | Urabayashi ........... | H04W 72/23 |

(Continued)

FOREIGN PATENT DOCUMENTS

| | | |
|---|---|---|
| CN | 102056185 A | 5/2011 |
| CN | 107046713 A | 8/2017 |

(Continued)

OTHER PUBLICATIONS

3GPP TS 38.211 V15.4.0 (Dec. 2018), "3rd Generation Partnership Project;Technical Specification Group Radio Access Network;NR;Physical channels and modulation(Release 15)," Dec. 2018, 96 pages.

(Continued)

*Primary Examiner* — Yemane Mesfin
*Assistant Examiner* — Salma Ayad
(74) *Attorney, Agent, or Firm* — Fish & Richardson P.C.

(57) ABSTRACT

Example communication methods and apparatus are described. One example method includes: when a terminal side device determines that first downlink control information (DCI) meets a first condition, the terminal side device uses a quantity of physical downlink control channel (PDCCH) candidates that are located in a first time unit and that are in a search space set corresponding to the first DCI as a first quantity of times of monitoring. In the first time unit, the terminal side device monitors, in the search space set corresponding to the first DCI based on the first quantity of times of monitoring, a PDCCH carrying the first DCI.

16 Claims, 6 Drawing Sheets

(51) Int. Cl.
*H04W 72/23* (2023.01)
*H04W 72/56* (2023.01)

(56) References Cited

U.S. PATENT DOCUMENTS

| | | | | |
|---|---|---|---|---|
| 2019/0182821 | A1* | 6/2019 | You | H04W 16/28 |
| 2020/0163062 | A1* | 5/2020 | Takeda | H04W 8/24 |
| 2020/0220691 | A1* | 7/2020 | Gao | H04L 5/001 |
| 2021/0050936 | A1* | 2/2021 | Seo | H04L 5/0053 |
| 2021/0067268 | A1* | 3/2021 | Seo | H04L 25/0238 |
| 2021/0099979 | A1* | 4/2021 | Takeda | H04W 72/23 |
| 2021/0112528 | A1* | 4/2021 | Lee | H04W 72/23 |
| 2021/0127374 | A1* | 4/2021 | Matsumura | H04L 5/0094 |
| 2022/0053540 | A1* | 2/2022 | Takeda | H04W 72/23 |
| 2022/0104201 | A1* | 3/2022 | Takeda | H04W 72/0453 |

FOREIGN PATENT DOCUMENTS

| | | |
|---|---|---|
| CN | 103947274 B | 8/2018 |
| CN | 109474384 A | 3/2019 |

OTHER PUBLICATIONS

3GPP TS 38.213 V15.4.0 (Dec. 2018), "3rd Generation Partnership Project; Technical Specification Group Radio Access Network; NR; Physical layer procedures for control (Release 15)," Dec. 2018, 104 pages.
3GPP TS 38.214 V15.4.0 (Dec. 2018), "3rd Generation Partnership Project; Technical Specification Group Radio Access Network;NR;Physical layer procedures for data(Release 15)," Dec. 2018, 102 pages.
3GPP TS 38.331 V15.4.0 (Dec. 2018), "3rd Generation Partnership Project; Technical Specification Group Radio Access Network; NR;Radio Resource Control (RRC) protocol specification(Release 15)," Dec. 2018, 474 pages.
ITU-T H.264 (Apr. 2017), "Series H: Audiovisual and Multimedia Systems, Infrastructure of audiovisual services—Coding of moving video, Advanced video coding for generic audiovisual services," Apr. 2017, 812 pages.
ITU-T H.265 (Feb. 2018), "Series H: Audiovisual and Multimedia Systems Infrastructure of audiovisual services—Coding of moving video, High efficiency video coding," Feb. 2018, 692 pages.
Office Action issued in Chinese Application No. 201910348322.8 on Mar. 16, 2021, 13 pages (with English translation).
PCT International Search Report and Written Opinion issued in International Application No. PCT/CN2020/084313 on Jul. 9, 2020, 15 pages (with English translation).
Samsung, "Reference Frame and PO Determination: Non Default Association," 3GPP TSG-RAN2 102, R2-1807689, Busan, South Korea, May 21-25, 2018, 7 pages.
Samsung, "SI Window Determination for SI Message Acquisition," 3GPP TSG-RAN2 Adhoc, R2-1809472, Montreal, Canada, Jul. 2-6, 2018, 7 pages.
Extended European Search Report issued in European Application No. 20798560.7 on May 17, 2022, 16 pages.
Intel Corporation, "NR PDCCH search spaces: BDs and channel estimation requirements," 3GPP TSG-RAN WG1 Meeting #92bis, R1-1804725, Sanya, P.R. China, Apr. 16-20, 2018, 8 pages.
NTT Docomo, Inc, "Offline summary for AI 7.1.3.1.2 Search space," 3GPP TSG RAN WG1 Meeting #92bis, R1-1805538, Sanya, China, Apr. 16-20, 2018, 40 pages.

* cited by examiner

COMMUNICATION METHOD AND APPARATUS

CROSS-REFERENCE TO RELATED APPLICATIONS

This application is a continuation of International Application No. PCT/CN2020/084313, filed on Apr. 10, 2020, which claims priority to Chinese Patent Application No. 201910348322.8, filed on Apr. 28, 2019. The aforementioned applications are hereby incorporated by reference in their entities.

TECHNICAL FIELD

This application relates to the field of communication technologies, and in particular, to a communication method and apparatus.

BACKGROUND

In a communication system, a network side device may send downlink control information (DCI) to a terminal side device on a physical downlink control channel (PDCCH). The network side device may configure a search space set corresponding to each DCI for the terminal side device by using higher layer signaling, but does not notify the terminal side device of a specific PDCCH candidate or specific PDCCH candidates, in the search space set, on which the DCI is to be sent. The terminal side device may determine, based on configuration information sent by the network side device, DCI that is currently expected to be received. Therefore, the terminal side device may perform, based on the configuration information, channel estimation on a PDCCH candidate in a search space set corresponding to the to-be-received DCI, and monitor whether the PDCCH candidate carries the DCI. The monitoring is relatively complex, and the terminal side device consumes a large amount of power. Therefore, a maximum quantity of times of monitoring to be performed by the terminal side device in one slot and a maximum quantity of control channel elements (CCEs) used for channel estimation are set.

In a conventional technology, to avoid that a quantity of times of monitoring in one time unit (for example, new radio (NR) slot) including 12 or 14 time domain symbols (for example, orthogonal frequency division multiplexing (OFDM) symbols) is greater than the maximum quantity of times of monitoring, and a quantity of CCEs used for channel estimation is greater than the maximum quantity of CCEs, before monitoring a PDCCH, the terminal side device needs to determine a quantity of times of monitoring to be performed on the PDCCH and a quantity of CCEs used for performing channel estimation on the PDCCH. In one NR slot, if two PDCCH candidates meet a preset condition, the two PDCCH candidates correspond to one time of monitoring; otherwise, the two PDCCH candidates correspond to two times of monitoring. The preset condition includes the following content:

The two PDCCH candidates correspond to a same CCE set, that is, the two PDCCH candidates have a same aggregation level, and CCEs included in the two PDCCH candidates have a same start CCE location; the two PDCCH candidates have a same scrambling code sequence; the two PDCCH candidates are from a same control resource set (CORESET); and lengths of DCI obtained through monitoring performed by the terminal side device in the two PDCCH candidates are the same.

To reduce a quantity of times of monitoring, the terminal side device needs to determine, based on the preset condition, whether each PDCCH candidate in a search space set corresponding to one piece of DCI and a PDCCH candidate in a search space set corresponding to another piece of DCI meet the preset condition. With reference to the foregoing descriptions, it can be learned that operations of determining, by the terminal side device, a quantity of times of monitoring to be performed on the PDCCH and a quantity of CCEs used for channel estimation consume a large amount of resources. Especially, when the terminal side device simultaneously receives a plurality of pieces of DCI, complexity of monitoring the PDCCH by the terminal side device significantly increases.

SUMMARY

Embodiments of this application provide a communication method and apparatus, to resolve a problem of how to reduce complexity of monitoring a PDCCH by a terminal side device.

According to a first aspect, an embodiment of this application provides a communication method. The method includes: If a terminal side device determines that first downlink control information (DCI) meets a first condition, the terminal side device uses a quantity of PDCCH candidates that are located in a first time unit and that are in a search space set corresponding to the first DCI as a first quantity of times of monitoring. In the first time unit, the terminal side device monitors, in the search space set corresponding to the first DCI based on the first quantity of times of monitoring, a PDCCH carrying the first DCI. The first condition includes one or more of the following:

the search space set corresponding to the first DCI has more than one monitoring occasion in preset duration;

the search space set corresponding to the first DCI has more than one monitoring occasion in preset duration, a control resource associated with the search space set corresponding to the first DCI is distributed in P symbols in the preset duration, and the first DCI does not overlap, in Q of the P symbols, control resources associated with search space sets corresponding to all other DCI of the terminal side device, where P is an integer greater than 0, and Q is less than or equal to P; or the first DCI is specified DCI.

The terminal side device receives a first instruction from a network side device, where the first instruction is used to instruct the terminal side device to use a quantity of PDCCH candidates included in a search space set corresponding to to-be-received DCI as a quantity of times of monitoring performed on a PDCCH carrying the DCI.

According to the foregoing method procedure, when determining that the first DCI meets the first condition, the terminal side device may directly use the quantity of PDCCH candidates that are located in the first time unit and that are in the search space set corresponding to the first DCI as the first quantity of times of monitoring in the first time unit. A quantity of times of monitoring in the first time unit does not need to be determined based on a preset condition in a conventional technology, so that complexity of monitoring the PDCCH by the terminal side device can be reduced, power consumption of the terminal side device can be further reduced, and system efficiency can be improved.

In a possible implementation, the specified DCI is DCI scrambled by using a specified radio network temporary identifier (RNTI); the specified DCI is DCI including a priority indication field; the specified DCI is DCI in a specified format; or the specified DCI is DCI including a specified quantity of bits.

In a possible implementation, for second DCI, the second DCI is any DCI in G pieces of DCI to be received by the terminal side device except the first DCI, and G is an integer greater than 1. The terminal side device uses a quantity of PDCCH candidates that are located in the first time unit and that are in a search space set corresponding to the second DCI as a second quantity of times of monitoring. In the first time unit, the terminal side device monitors, in the search space set corresponding to the second DCI based on the second quantity of times of monitoring, a PDCCH carrying the second DCI.

In a possible implementation, when monitoring, in the search space set corresponding to the first DCI based on the first quantity of times of monitoring, the PDCCH carrying the first DCI, the terminal side device ignores whether the first quantity of times of monitoring is greater than a maximum first quantity of times of monitoring.

In a possible implementation, when monitoring, in the search space set corresponding to the first DCI based on the first quantity of times of monitoring, the PDCCH carrying the first DCI, the terminal side device ignores whether a quantity of non-overlapping control channel elements (CCEs) used for performing channel estimation on the PDCCH carrying the first DCI is greater than a maximum first quantity of CCEs.

In a possible implementation, the method further includes: If determining that the first DCI does not meet the first condition, the terminal side device determines, based on a second condition, a third quantity of times, of monitoring, corresponding to H PDCCH candidates that are located in the first time unit and that are in the search space set corresponding to the first DCI, where H is an integer greater than 0. If a first PDCCH candidate in the H PDCCH candidates and a second PDCCH candidate in L PDCCH candidates meet the second condition, the first PDCCH candidate and the second PDCCH candidate correspond to one time of monitoring; or if a first PDCCH candidate in the H PDCCH candidates and a second PDCCH candidate in L PDCCH candidates do not meet the second condition, the first PDCCH candidate and the second PDCCH candidate correspond to two times of monitoring; the first PDCCH candidate is any one of the H PDCCH candidates, the second PDCCH candidate is any one of the L PDCCH candidates, and L is an integer greater than 0; and the L PDCCH candidates include a PDCCH candidate in the H PDCCH candidates except the first PDCCH candidate, and include PDCCH candidates that are located in the first time unit and that are in all search space sets whose priorities are less than the search space set corresponding to the first DCI. If determining that the third quantity of times of monitoring is less than or equal to a remaining maximum quantity of times of monitoring, in the first time unit, the terminal side device monitors, in the search space set corresponding to the first DCI based on the third quantity of times of monitoring, the PDCCH carrying the first DCI, where the remaining maximum quantity of times of monitoring is equal to a difference between a maximum second quantity of times of monitoring and a sum of quantities of times, of monitoring, corresponding to all search space sets whose priorities are greater than the search space set corresponding to the first DCI.

In a possible implementation, if determining that the third quantity of times of monitoring is greater than the remaining maximum quantity of times of monitoring, the terminal side device ignores the search space set corresponding to the first DCI.

According to a second aspect, an embodiment of this application provides a communication method, including: A network side device generates first downlink control information (DCI) that meets a first condition, where a quantity of PDCCH candidates that are located in a first time unit and that are in a search space set corresponding to the first DCI is equal to a first quantity of times of monitoring performed by a terminal side device on a PDCCH carrying the first DCI in the first time unit. The first condition includes one or more of the following:

the search space set corresponding to the first DCI has more than one monitoring occasion in preset duration;
the search space set corresponding to the first DCI has more than one monitoring occasion in preset duration, a control resource associated with the search space set corresponding to the first DCI is distributed in P symbols in the preset duration, and the first DCI does not overlap, in Q of the P symbols, control resources associated with search space sets corresponding to all other DCI of the terminal side device, where P is an integer greater than 0, and Q is less than or equal to P; or
the first DCI is specified DCI.

The network side device sends a first instruction to the terminal side device before generating the first DCI, where the first instruction is used to instruct the terminal side device to use a quantity of PDCCH candidates included in a search space set corresponding to to-be-received DCI as a quantity of times of monitoring performed on a PDCCH carrying the DCI.

The network side device sends the first DCI on the PDCCH.

According to the foregoing method procedure, when the first DCI generated by the network side device meets the first condition, the terminal side device may directly use the quantity of PDCCH candidates that are located in the first time unit and that are in the search space set corresponding to the first DCI as the first quantity of times of monitoring in the first time unit. A quantity of times of monitoring in the first time unit does not need to be determined based on a preset condition in a conventional technology, so that complexity of monitoring the PDCCH by the terminal side device can be reduced, power consumption of the terminal side device can be further reduced, and system efficiency can be improved.

In a possible implementation, the first quantity of times of monitoring is less than or equal to a maximum first quantity of times of monitoring.

In a possible implementation, a quantity of non-overlapping control channel elements (CCEs) used by the terminal side device to perform channel estimation on the PDCCH carrying the first DCI is less than or equal to a maximum first quantity of CCEs.

According to a third aspect, an embodiment of this application provides a communication method, including:

A network side device determines a configuration parameter, where the configuration parameter is used to configure at least one search space set and a control resource set associated with each of the at least one search space set; and in the at least one search space set, a quantity of search space sets associated with a same control resource set is less than or equal to M, and the search space sets associated with the same control resource set have a same monitoring occasion, where M is an integer greater than 0, M is less than N, and N is a maximum quantity, of search space sets, configured on a same bandwidth part of a same cell. The network side device sends the configuration parameter to a terminal side device.

In a possible implementation, the method further includes: In the at least one search space set, lengths of downlink control information (DCI) corresponding to all search space sets associated with the same control resource set are the same.

According to a fourth aspect, an embodiment of this application provides a communication method, including: A terminal side device receives a configuration parameter from a network side device, where the configuration parameter is used to configure at least one search space set and a control resource set associated with each of the at least one search space set; and in the at least one search space set, a quantity of search space sets associated with a same control resource set is less than or equal to M, and the search space sets associated with the same control resource set have a same monitoring occasion, where M is an integer greater than 0, M is less than N, and N is a maximum quantity, of search space sets, configured on a same bandwidth part of a same cell. The terminal side device performs monitoring in the at least one search space set based on the configuration parameter.

Currently, in a conventional technology, a maximum quantity of search space sets associated with the same control resource set may be equal to N. When planning algorithm complexity, the terminal side device needs to reserve, based on the maximum quantity N, resources for control channel monitoring. When N is equal to 10, the complexity is very high. However, according to the foregoing method, by limiting the quantity of search space sets associated with the same control resource set to M, a quantity of times, of monitoring, corresponding to a quantity of PDCCH candidates, that needs to be determined based on the second condition in one control resource set can be reduced, thereby reducing complexity of the terminal side device.

In a possible implementation, the method further includes: In the at least one search space set, lengths of downlink control information (DCI) corresponding to all search space sets associated with the same control resource set are the same.

In a conventional technology, the second condition includes four pieces of content, one of which is to determine that lengths of DCI obtained through monitoring performed by the terminal side device in two PDCCH candidates are the same. By limiting a quantity of search space sets that correspond to the DCI with the same length and that are associated with the same control resource set, a quantity of times, of monitoring, corresponding to a quantity of PDCCH candidates, that needs to be determined based on the second condition in one control resource set can be reduced, thereby reducing the complexity of the terminal side device.

According to a fifth aspect, an embodiment of this application provides a communication method, including: A network side device determines a configuration parameter, where the configuration parameter is used to configure at least one search space set and a control resource set associated with each of the at least one search space set; and in the at least one search space set, monitoring occasions of all search space sets that are associated with a same control resource set and whose monitoring occasion periodicities each are less than a preset periodicity do not overlap in time domain. The network side device sends the configuration parameter to a terminal side device.

According to a sixth aspect, an embodiment of this application provides a communication method, including: A terminal side device receives a configuration parameter from a network side device, where the configuration parameter is used to configure at least one search space set and a control resource set associated with each of the at least one search space set; and in the at least one search space set, monitoring occasions of all search space sets that are associated with a same control resource set and whose monitoring occasion periodicities each are less than a preset periodicity do not overlap in time domain. The terminal side device performs monitoring in the at least one search space set based on the configuration parameter.

Because for a search space set that has more than one monitoring occasion in one preset time interval, the monitoring occasions appear at a plurality of locations in the preset time interval, and the locations are relatively flexible, if limitation is performed based on the foregoing condition, the locations of the monitoring occasions may be limited, thereby reducing complexity of monitoring performed by the terminal side device.

According to a seventh aspect, an embodiment of this application provides a communication method, including: A network side device determines a configuration parameter, where the configuration parameter is used to configure at least one search space set and a control resource set associated with each of the at least one search space set; and in the at least one search space set, a total quantity of PDCCH candidates included in each search space set is less than a first preset quantity. The network side device sends the configuration parameter to a terminal side device.

By limiting the total quantity of PDCCH candidates included in each search space set, complexity of determining, by the terminal side device, a quantity of times of monitoring based on the total quantity of PDCCH candidates included in the search space set may be further reduced.

According to an eighth aspect, an embodiment of this application provides a communication method, including: A terminal side device receives a configuration parameter from a network side device, where the configuration parameter is used to configure at least one search space set and a control resource set associated with each of the at least one search space set; and in the at least one search space set, a total quantity of PDCCH candidates included in each search space set is less than a first preset quantity. The terminal side device performs monitoring in the at least one search space set based on the configuration parameter.

By limiting the total quantity of PDCCH candidates included in each search space set, complexity of determining, by the terminal side device, a quantity of times of monitoring based on the total quantity of PDCCH candidates included in the search space set may be further reduced.

According to a ninth aspect, an embodiment of this application provides a communication method, including: A network side device determines a configuration parameter, where the configuration parameter is used to configure at least one search space set and a control resource set associated with each of the at least one search space set; and in the at least one search space set, a quantity of PDCCH candidates included in each search space set at each aggregation level is less than a second preset quantity. The network side device sends the configuration parameter to a terminal side device.

According to a tenth aspect, an embodiment of this application provides a communication method, including: A terminal side device receives a configuration parameter from a network side device, where the configuration parameter is used to configure at least one search space set and a control resource set associated with each of the at least one search space set; and in the at least one search space set, a quantity of PDCCH candidates included in each search space set at each aggregation level is less than a second preset quantity. The terminal side device performs monitoring in the at least one search space set based on the configuration parameter.

By limiting a total quantity of PDCCH candidates included in each search space set at each aggregation level, complexity of determining, by the terminal side device, a quantity of times of monitoring based on the total quantity of PDCCH candidates included in the search space set may be further reduced.

According to an eleventh aspect, an embodiment of this application provides a communication method, including: A network side device determines first indication information, where the first indication information is used to indicate the terminal side device not to perform a first operation on any PDCCH candidate in a common search space set or any PDCCH candidate in a user equipment specific search space set, where the first operation is used to determine, based on a second condition, a quantity of times, of monitoring, corresponding to two PDCCH candidates. If the two PDCCH candidates meet the second condition, the two PDCCH candidates correspond to one time of monitoring; otherwise, the two PDCCH candidates correspond to two times of monitoring. The second condition includes the following content:
 the two PDCCH candidates correspond to a same CCE set;
 the two PDCCH candidates have a same scrambling code sequence; and
 the two PDCCH candidates are from a same control resource set (CORESET).

The network side device sends the first indication information to the terminal side device.

According to a twelfth aspect, an embodiment of this application provides a communication method, including: A terminal side device receives first indication information from a network side device, where the first indication information is used to indicate the terminal side device not to perform a first operation on any PDCCH candidate in a common search space set or any PDCCH candidate in a user equipment specific search space set, where the first operation is used to determine, based on a second condition, a quantity of times, of monitoring, corresponding to two PDCCH candidates. If the two PDCCH candidates meet the second condition, the two PDCCH candidates correspond to one time of monitoring; otherwise, the two PDCCH candidates correspond to two times of monitoring. The second condition includes the following content:
 the two PDCCH candidates correspond to a same CCE set;
 the two PDCCH candidates have a same scrambling code sequence; and
 the two PDCCH candidates are from a same control resource set (CORESET).

The terminal side device determines, based on the first indication information, a quantity of times of monitoring.

In the foregoing method, the network side device directly indicates, by using higher layer signaling, the terminal side device not to determine, based on the second condition, a quantity of times of monitoring performed on a PDCCH candidate in the common search space set or a PDCCH candidate in the user equipment specific search space set. This is equivalent to reducing a quantity of PDCCH candidates to be compared when the quantity of times of monitoring is determined based on the second condition. In this way, complexity of determining, by the terminal side device, the quantity of times of monitoring is reduced.

According to a thirteenth aspect, this application provides an apparatus. The apparatus has a function of implementing the terminal side device in the first aspect to the twelfth aspect. For example, the apparatus includes modules, units, or means corresponding to the steps performed by the terminal side device in the first aspect to the twelfth aspect. The functions, the units, or the means may be implemented by software, implemented by hardware, or may be implemented by hardware executing corresponding software.

In a possible design, the apparatus includes a processing unit and a transceiver unit. Functions performed by the processing unit and the transceiver unit may correspond to the steps performed by the terminal side device in the first aspect to the twelfth aspect.

In a possible design, the apparatus includes a processor, and may further include a transceiver. The transceiver is configured to receive and send a signal, and the processor executes program instructions, to complete the method performed by the terminal side device in any one of the possible designs or implementations in the first aspect to the twelfth aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data required for implementing the functions of the terminal side device in the first aspect to the twelfth aspect. The processor may execute the computer program instructions stored in the memory, to complete the method performed by the terminal side device in any one of the possible designs or implementations in the first aspect to the twelfth aspect.

According to a fourteenth aspect, this application provides an apparatus. The apparatus has a function of implementing the network side device in the first aspect to the twelfth aspect. For example, the apparatus includes modules, units, or means corresponding to the steps performed by the network side device in the first aspect to the twelfth aspect. The functions, the units, or the means may be implemented by software, implemented by hardware, or may be implemented by hardware executing corresponding software.

In a possible design, the apparatus includes a processing unit and a transceiver unit. Functions performed by the processing unit and the transceiver unit may correspond to the steps performed by the network side device in any one of the possible designs or implementations in the first aspect to the twelfth aspect.

In another possible design, the communication apparatus includes a processor, and may further include a transceiver. The transceiver is configured to receive and send a signal, and the processor executes program instructions, to complete the method performed by the network side device in any one of the possible designs or implementations in the first aspect to the twelfth aspect.

The apparatus may further include one or more memories, and the memory is configured to be coupled to the processor. The one or more memories may be integrated with the processor, or may be separate from the processor. This is not limited in this application.

In a possible manner, the memory stores computer program instructions and/or data required for implementing the functions of the network side device in any one of the possible designs or implementations in the first aspect to the twelfth aspect. The processor may execute the computer program instructions stored in the memory, to complete the method performed by the network side device in any one of the possible designs or implementations in the first aspect to the twelfth aspect.

An embodiment of this application provides a computer-readable storage medium. The computer storage medium stores computer-readable instructions. When a computer reads and executes the computer-readable instructions, the computer is enabled to perform the method according to any one of the foregoing possible designs. The computer may be the foregoing terminal side device or network side device.

An embodiment of this application provides a computer program product. When a computer reads and executes the computer program product, the computer is enabled to perform the method according to any one of the foregoing possible designs.

An embodiment of this application provides a chip. The chip is connected to a memory, and is configured to read and execute a software program stored in the memory, to implement the method according to any one of the foregoing possible designs.

An embodiment of this application provides a communication system, including any one of the foregoing possible terminal side devices and any one of the foregoing possible network side devices.

DESCRIPTION OF EMBODIMENTS

The following describes embodiments of this application in detail with reference to the accompanying drawings of this specification.

The embodiments of this application may be used in various mobile communication systems, for example, a new radio (NR) system, a long term evolution (LTE) system, an advanced long term evolution (LTE-A) system, an evolved long term evolution (eLTE) system, and another communication system such as a future communication system. This is not specifically limited herein.

Figure 1:
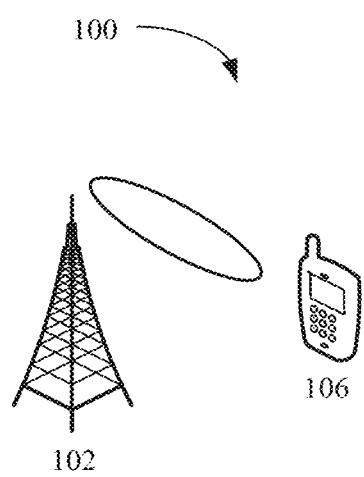
FIG. 1 is a schematic diagram of a communication system applicable to an embodiment of this application.

For ease of understanding the embodiments of this application, a communication system shown in FIG. 1 is first used as an example to describe in detail a communication system applicable to the embodiments of this application. FIG. 1 is a schematic diagram of a communication system applicable to a communication method according to an embodiment of this application. As shown in FIG. 1, the communication system 100 includes a network side device 102 and a terminal side device 106. A plurality of antennas may be configured for the network side device 102, and a plurality of antennas may also be configured for the terminal side device 106. The network side device 102 may send DCI to the terminal side device 106 on a PDCCH. DCI of different terminal side devices is identified by using cell radio network temporary identifiers (C-RNTIs) corresponding to the terminal side devices, that is, cyclic redundancy check (CRC) of DCI of different terminal side devices is scrambled by using C-RNTIs of the terminal side devices. Because a terminal side device does not know a specific PDCCH candidate or specific PDCCH candidates on which a network side device receives DCI, the terminal side device needs to attempt to decode each PDCCH candidate in a search space set corresponding to the DCI. To be specific, the terminal side device performs, by using a C-RNTI of the terminal side device, CRC check on information carried on the PDCCH candidate. If the CRC check succeeds, the terminal side device determines that the DCI is successfully received. A behavior in which the terminal side device attempts to decode each PDCCH candidate to determine whether the corresponding DCI is received may also be referred to as blind detection (BD) performed on a PDCCH.

In the embodiments of this application, the terminal side device is a device having a wireless transceiver function or a chip that can be disposed in the device. The device having the wireless transceiver function may also be referred to as user equipment (UE), an access terminal, a subscriber unit, a subscriber station, a mobile station, a remote station, a remote terminal, a mobile device, a user terminal, a user agent, or a user apparatus. During actual application, the terminal side device in the embodiments of this application may be a mobile phone, a tablet, a computer having a wireless transceiver function, a virtual reality (VR) terminal, an augmented reality (AR) terminal, a wireless terminal in industrial control, a wireless terminal in self driving, a wireless terminal in telemedicine, a wireless terminal in a smart grid, a wireless terminal in transportation safety, a wireless terminal in a smart city, a wireless terminal in a smart home, or the like. An application scenario is not limited in the embodiments of this application. In this application, the device having the wireless transceiver function and the chip that can be disposed in the device are collectively referred to as terminal side devices.

In the embodiments of this application, the network side device may be a radio access device in various standards, for example, an evolved NodeB (eNB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, or a transmission point (TRP or TP). The network side device may alternatively be a gNB or a TRP or TP in a 5G (NR) system, one antenna panel or a group of antenna panels (including a plurality of antenna panels) of a base station in a 5G system, a network node, for example, a baseband unit (BBU), that constitutes a gNB or a transmission point, a DU in a central unit-distributed unit (CU-DU) architecture, or the like.

The following describes some terms in this application, to facilitate understanding of a person skilled in the art.

A symbol includes but is not limited to an orthogonal frequency division multiplexing (OFDM) symbol, a sparse code multiple access (SCMA) symbol, a filtered orthogonal frequency division multiplexing (F-OFDM) symbol, and a non-orthogonal multiple access (NOMA) symbol. The symbol may be specifically determined based on an actual situation. Details are not described herein.

Slot: A slot is a basic time unit that occupies a plurality of consecutive OFDM symbols in time domain. For example, in LTE, one slot occupies six or seven consecutive OFDM symbols in time domain. In NR, one slot occupies 14 consecutive OFDM symbols (normal cyclic prefixes) or 12 consecutive OFDM symbols (extended cyclic prefixes) in time domain.

Aggregation level (AL): A quantity of CCEs included in one PDCCH is referred to as an aggregation level of the PDCCH. For example, if the PDCCH includes four CCEs, the aggregation level of the PDCCH is 4.

PDCCH candidate: A standard protocol specifies a quantity of PDCCH candidates at each aggregation level, that is, a time-frequency resource location at which the PDCCH may appear.

A control resource set (CORESET) is a concept proposed in an NR system, and may be understood as a time-frequency resource set. In time domain, one CORESET may be configured as one or several consecutive OFDM symbols. In frequency domain, one CORESET may be a group of consecutive or non-consecutive frequency domain resources, including search spaces at different aggregation levels.

Search space: All PDCCH candidates corresponding to one given aggregation level in one CORESET form one search space. A sum of search spaces corresponding to all aggregation levels corresponding to one piece of DCI may be referred to as a search space set (search space set).

The network architecture and the service scenario described in the embodiments of this application are intended to describe the technical solutions in the embodiments of this application more clearly, but constitute no limitation on the technical solutions provided in the embodiments of this application. A person of ordinary skill in the art may learn that the technical solutions provided in the embodiments of this application are also applicable to a similar technical problem as the network architecture evolves and a new service scenario emerges.

Figure 2:
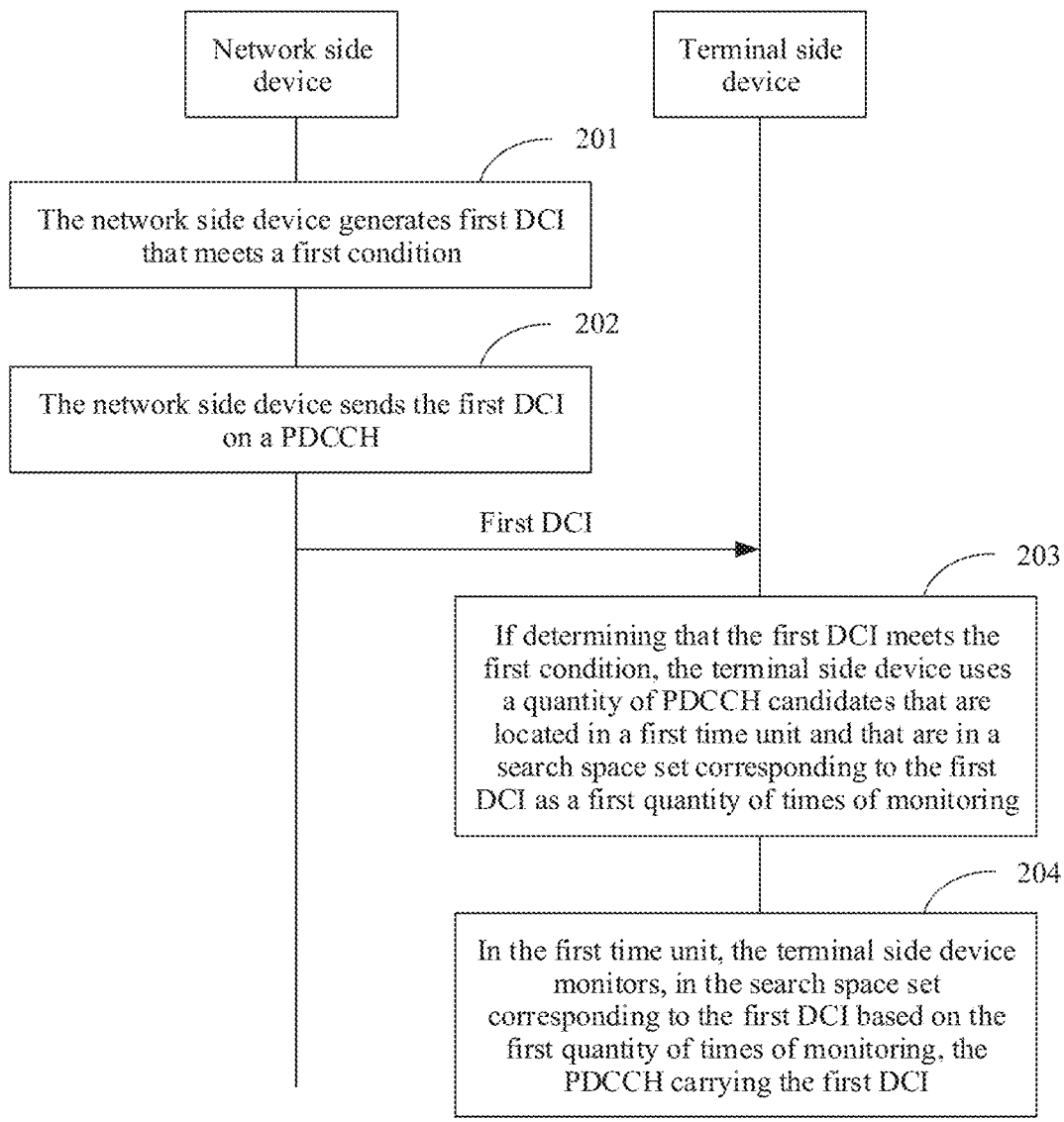
FIG. 2 is a schematic flowchart of a communication method according to an embodiment of this application.

FIG. 2 is a schematic flowchart of a communication method according to an embodiment of this application. The method includes the following steps.

Step 201: A network side device generates first DCI that meets a first condition.

A quantity of PDCCH candidates that are located in a first time unit and that are in a search space set corresponding to the first DCI is equal to a first quantity of times of monitoring performed by a terminal side device on a PDCCH carrying the first DCI in the first time unit.

It should be noted that the first time unit may be a slot in an NR system or a half-slot (that is, half of the NR slot, where the half-slot includes six or seven OFDM symbols), a time span (span, which includes several OFDM symbols, and may be configured by the network side device or predefined in a protocol), or may be a subframe (including two LTE slots) in an LTE system, or the like. The first time unit may be specifically determined based on an actual situation, and details are not described herein again.

Step 202: The network side device sends the first DCI on the PDCCH.

Step 203: If determining that the first DCI meets the first condition, the terminal side device uses the quantity of PDCCH candidates that are located in the first time unit and that are in the search space set corresponding to the first DCI as the first quantity of times of monitoring.

Step 204: In the first time unit, the terminal side device monitors, in the search space set corresponding to the first DCI based on the first quantity of times of monitoring, the PDCCH carrying the first DCI.

According to the foregoing method procedure, when determining that the first DCI meets the first condition, the terminal side device may directly use the quantity of PDCCH candidates that are located in the first time unit and that are in the search space set corresponding to the first DCI as the first quantity of times of monitoring in the first time unit. A quantity of times of monitoring in the first time unit does not need to be determined based on a complex preset condition in a conventional technology, so that complexity of monitoring the PDCCH by the terminal side device can be reduced, power consumption of the terminal side device can be further reduced, and system efficiency can be improved.

In this embodiment of this application, the first condition includes one or more of the following:

First: The search space set corresponding to the first DCI has more than one monitoring occasion in preset duration. A value of the preset duration may be determined based on the actual situation. For example, the preset duration may be one slot or one span. Certainly, the preset duration may alternatively be another value, and details are not described herein again. One monitoring occasion indicates a time domain resource on which one PDCCH candidate is located.

It should be noted that a periodicity and a specific pattern (distribution of specific locations of the monitoring occasions in time domain and in frequency domain) of the monitoring occasions of the search space set are configured by the network side device and then sent to the terminal side device in a manner such as higher layer signaling.

For example, the monitoring occasion of the search space set is determined by a monitoring slot periodicity and offset (monitoringSlotPeriodicityAndOffset) and a symbol in a monitoring slot (monitoringSymbolsWithinSlot) that are in a parameter SearchSpace.

monitoringSymbolsWithinSlot is used to determine a periodicity and an offset location of the search space set. The periodicity is in a unit of slot. For a format thereof, refer to one of the following choices

| monitoringSlotPeriodicityAndOffset | CHOICE { |
|---|---|
| sl1 | NULL, |
| sl2 | INTEGER (0..1), |
| sl4 | INTEGER (0..3), |
| sl5 | INTEGER (0..4), |
| sl8 | INTEGER (0..7), |
| sl10 | INTEGER (0..9), |
| sl16 | INTEGER (0..15), |
| sl20 | INTEGER (0..19), |
| sl40 | INTEGER (0..39), |
| sl80 | INTEGER (0..79), |
| sl160 | INTEGER (0..159), |
| sl320 | INTEGER (0..319), |
| sl640 | INTEGER (0..639), |
| sl1280 | INTEGER (0..1279), |
| sl2560 | INTEGER (0..2559) |
| } | |

In the foregoing format, for example, sl5 in the parameter indicates that a set of monitoring occasions of the search space set occur every five slots. INTEGER (0 . . . 4) corresponding to sl5 indicates locations of the monitoring occasions in every five slots. 0 indicates the location in the first slot, and 4 indicates the location in the fifth slot. Another case may be deduced by analogy. Details are not described again.

monitoringSymbolsWithinSlot is a 14-bit bitmap. Each bit corresponds to one OFDM symbol in one slot. From left to right of the bitmap, bits sequentially correspond to 14 OFDM symbols in one slot in a time sequence, to be specific, the leftmost bit corresponds to the first symbol in the slot, and the last bit corresponds to the 14th symbol in the slot. If a bandwidth part (BWP) corresponding to the search space set uses an extended cyclic prefix (CP), there are only 12 OFDM symbols in each slot, and the last two bits of the 14 bits are ignored. If a bit in monitoringSymbolsWithinSlot is set to 1, it indicates that an OFDM symbol corresponding to the bit includes one monitoring occasion, and the OFDM symbol corresponding to the bit is a start symbol of the monitoring occasion. This means that a time-frequency resource on which one search space set is located starts from the OFDM symbol. If a bit is set to 0, it indicates that an OFDM symbol corresponding to the bit does not include a start symbol of the monitoring occasion. If a plurality of bits are set to 1, it indicates that there are a plurality of monitoring occasions in the slot, that is, a periodicity of the monitoring occasions is less than one slot.

If the preset duration is one slot, with reference to the foregoing descriptions, when monitoringSlotPeriodicityAndOffset corresponding to one piece of DCI is set to sl1, and a quantity of valid bits whose value is 1 in monitoringSymbolsWithinSlot is greater than 1, it indicates that the DCI meets the first condition. When the bandwidth part corresponding to the search space set is an extended CP, the last two bits are invalid bits, and the other bits are valid bits. When the bandwidth part corresponding to the search space set is a normal CP, all bits are valid bits.

Second: The search space set corresponding to the first DCI has more than one monitoring occasion in preset duration, a control resource associated with the search space set corresponding to the first DCI is distributed in P symbols in the preset duration, and the first DCI does not overlap, in Q of the P symbols, control resources associated with search space sets corresponding to all other DCI of the terminal side device, where P is an integer greater than 0, and Q is less than or equal to P.

For example, the preset duration is one slot, P is equal to 14, and it is assumed that the Q symbols are the last 12 symbols in each slot. Two search space sets are configured for the terminal side device in one slot: a search space set 1 and a search space set 2. The two search space sets both have more than one monitoring occasion in one slot. If monitoringSymbolsWithinSlot of the search space set 1 is 10 10 00 10 00 10 00, monitoringSymbolsWithinSlot of the search space set 2 is 10 00 10 00 10 00 10, and a control resource associated with each search space set lasts for two symbols in time, control resources associated with search space sets corresponding to the search space set 1 and the search space set 2 may be shown in FIG. 3. It can be learned from FIG. 3 that, in the last 12 symbols in one slot, that is, a symbol 2 to a symbol 13 in FIG. 3, the control resource associated with the search space corresponding to the search space set 2 does not overlap the control resource associated with the search space set corresponding to the search space set 1. Therefore, DCI corresponding to the search space set 2 is DCI that meets the first condition.

"The first DCI does not overlap the control resources associated with the search space sets corresponding to all other DCI of the terminal side device". Because the terminal side device may also be configured to monitor a plurality of pieces of DCI in one search space set, for example, be configured to monitor DCI 1 and DCI 2 in the search space set 1, when it is determined whether the DCI 1 meets the first condition, the DCI 2 does not fall within a range of "all other DCI".

Figure 3:
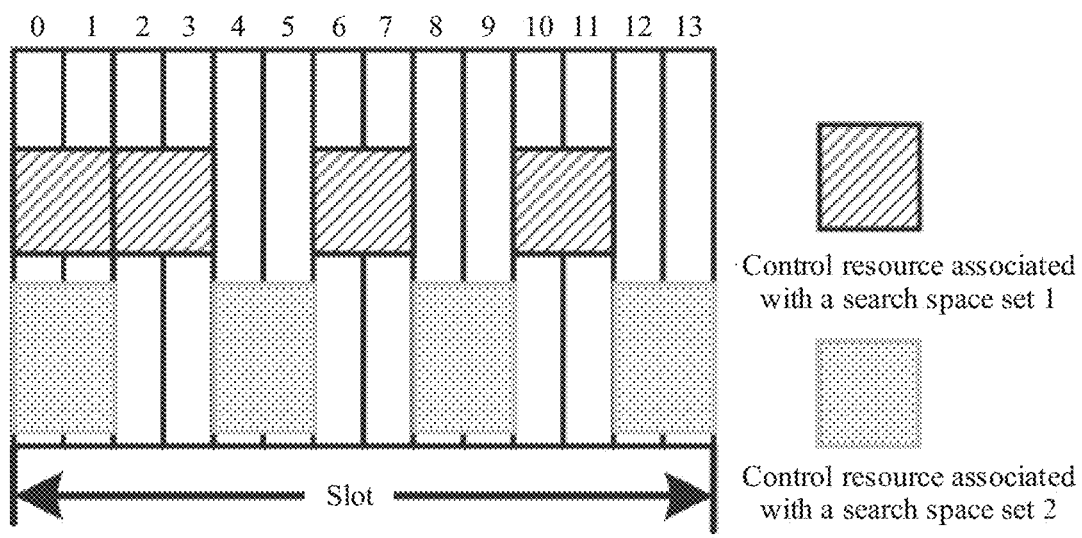
FIG. 3 is a schematic diagram of control resources according to an embodiment of this application.

In addition, to better support a URLLC service, a concept of a span is introduced in NR R16, and the span is a shorter time unit than the slot. A length of each span is at least Y consecutive OFDM symbols, and Y is an integer greater than 0. The Y consecutive OFDM symbols are consecutive in time domain (where an interval with more than one OFDM symbol does not exist). For example, a symbol 0 to the symbol 2 in FIG. 3 are three consecutive symbols, and the symbol 2 to the symbol 13 in FIG. 3 are 12 consecutive symbols.

For example, the network side device may indicate, by using higher layer signaling (for example, radio resource control signaling), whether the terminal side device supports a case in which a time interval between start symbols of two spans is at least X consecutive OFDM symbols. The terminal side device has at least one PDCCH monitoring occasion in each of the two spans, and at least one of the PDCCH monitoring occasions is not a monitoring occasion in a downlink basic capability. Possible combinations of X and Y are (X, Y)=(7, 3), (X, Y)={(4, 3), (7, 3)}, or (X, Y)={(2, 2), (4, 3), (7, 3)}. An advantage of the introduction of the span is that the time unit of control information and data scheduling can be changed from slot to span, and a service transmission latency is reduced.

Span division in one slot is preset in a protocol, configured by a base station by using a higher layer parameter, or determined by a user according to a protocol preset rule and based on the higher layer parameter. One span includes several symbols, and lengths of all spans in one slot may be the same or may be different. For example, a length of a span is 7 symbols, and a length of another span is 1 or 2 symbols.

Considering the introduction of the span, the condition may also be modified as follows: The search space set corresponding to the first DCI has more than one monitoring occasion in preset duration, a control resource associated with the search space set corresponding to the first DCI is distributed in P spans in the preset duration, and the first DCI does not overlap, in Q of the P spans, control resources associated with search space sets corresponding to all other DCI of the terminal side device, where P is an integer greater than 0, and Q is less than or equal to P.

Third: The first DCI is specified DCI.

In this embodiment of this application, the specified DCI may be DCI scrambled by using a specified radio network temporary identifier (RNTI). The specified RNTI is an RNTI agreed upon in advance by the network side device and the terminal side device. When determining that received DCI is scrambled by using the specified RNTI, the terminal side device may determine that the DCI is the specified DCI.

For example, in another possible implementation, the specified DCI is DCI including a priority indication field. Specific content of the priority indication field is not limited in this embodiment of this application. Details are not described herein again. The terminal side device may determine content such as a format of to-be-received DCI, a quantity of bits included in the to-be-received DCI, and fields included in the to-be-received DCI. Therefore, when determining that the to-be-received DCI includes the priority indication field, the terminal side device may determine that the DCI is the specified DCI.

For example, in another possible implementation, the specified DCI is DCI in a specified format. As described above, the terminal side device may predetermine a format of to-be-received DCI. When determining that the to-be-received DCI is the DCI in the specified format, the terminal side device may determine that the DCI is the specified DCI. It should be noted that the DCI may have a plurality of functions, and DCI with different functions may be distinguished from each other by using DCI formats. For example, in an LTE system, when a format of DCI is format 0, the DCI is used for physical uplink shared channel (PUSCH) scheduling; or when a format of DCI is format 1A, the DCI includes a PDCCH order, where the PDCCH order is used to indicate the terminal side device to initiate a random access process. For another example, in an NR system, when formats of DCI are format 0_0 and format 0_1, the DCI is used for PUSCH scheduling; or when formats of DCI are format 1_0 and format 1_1, the DCI is used for PUSCH scheduling.

For example, in another possible implementation, the specified DCI is DCI including a specified quantity of bits. When determining that to-be-received DCI includes a specified quantity of bits, the terminal side device may determine that the DCI is the specified DCI.

If the specified DCI is configured for the terminal side device, the terminal side device may directly use the quantity of PDCCH candidates that are located in the first time unit and that are in the search space set corresponding to the first DCI as the first quantity of times of monitoring, so that compared with a method of determining the first quantity of times of monitoring based on a conventional technology, in this implementation, a large amount of time can be saved. The terminal side device may use the saved time for other processing, for example, control channel monitoring, control information parsing, and data receiving, to better meet a low-latency and high-reliability receiving requirement.

Fourth: The network side device sends a first instruction to the terminal side device before generating the first DCI, or the terminal side device receives a first instruction from the network side device, where the first instruction is used to instruct the terminal side device to use a quantity of PDCCH candidates included in a search space set corresponding to to-be-received DCI as a quantity of times of monitoring performed on a PDCCH carrying the DCI.

The foregoing is merely an example, and the first condition may further include other content. Details are not described herein again.

For example, when monitoring, in the search space set corresponding to the first DCI based on the first quantity of times of monitoring, the PDCCH carrying the first DCI, the terminal side device ignores whether the first quantity of times of monitoring is greater than a maximum first quantity of times of monitoring. The maximum first quantity of times of monitoring is a maximum quantity of times that the terminal side device can monitor the PDCCH in the first time unit, and the maximum first quantity of times of monitoring is configured by the network side device, or the maximum first quantity of times of monitoring is a remaining maximum quantity of times of monitoring obtained through calculation by the terminal side device based on a maximum quantity of total times, of monitoring, configured by the network side device and a quantity of times, of monitoring, configured for another search space set. The another search space set herein may be a search space set whose priority is higher than the search space set corresponding to the first DCI. The priority may be determined based on an index value of the search space set, where a smaller index value indicates a higher priority; a priority of a common search space set is higher than that of a user-specific search space set; or the priority may be determined based on a combination of the two conditions.

In a conventional technology, the terminal side device needs to compare the first quantity of times of monitoring with the maximum first quantity of times of monitoring. If the first quantity of times of monitoring is larger, the terminal side device ignores the first DCI, that is, no longer receives the first DCI, and does not monitor the PDCCH in the search space set corresponding to the first DCI. Correspondingly, if the first quantity of times of monitoring and the maximum first quantity of times of monitoring are equal or the maximum first quantity of times of monitoring is larger, when a quantity of non-overlapping CCEs used for performing channel estimation on the PDCCH carrying the first DCI is less than or equal to a maximum first quantity of CCEs, the terminal side device monitors, in the first time unit based on the first quantity of times of monitoring, the PDCCH carrying the first DCI, where a maximum quantity of times of monitoring is the first quantity of times of monitoring. If the PDCCH is not detected after the first quantity of times of monitoring is performed, the terminal side device no longer performs monitoring, and determines that the first DCI fails to be received. The maximum first quantity of CCEs is a maximum quantity of CCEs that can be used by the terminal side device to perform channel estimation in the first time unit, and the maximum first quantity of CCEs is configured by the network side device.

For example, when monitoring, in the search space set corresponding to the first DCI based on the first quantity of times of monitoring, the PDCCH carrying the first DCI, the terminal side device ignores whether the quantity of non-overlapping CCEs used for performing channel estimation on the PDCCH carrying the first DCI is greater than the maximum first quantity of CCEs.

In a conventional technology, the terminal side device needs to compare the determined quantity of non-overlapping CCEs with the maximum first quantity of CCEs. If the quantity of non-overlapping CCEs is larger, the terminal side device ignores the first DCI, that is, no longer receives the first DCI, and does not monitor the PDCCH in the search space set corresponding to the first DCI.

For example, in this embodiment of this application, the terminal side device may need to receive a plurality of pieces of DCI in one time unit. If the terminal side device determines that any one of the plurality of pieces of DCI meets the first condition, it may be considered that the plurality of pieces of DCI meet the first condition. That is, for any one of the plurality of pieces of DCI, in any time unit, the terminal side device uses, for each of a plurality of pieces of DCI, a quantity of PDCCH candidates that are located in the time unit and that are in a search space set corresponding to the DCI as a maximum quantity of times of monitoring performed on a PDCCH carrying the DCI in the time unit.

For example, the terminal side device is to receive G pieces of DCI. For second DCI, the second DCI is any DCI in G pieces of DCI to be received by the terminal side device except the first DCI, and G is an integer greater than 1. The terminal side device uses a quantity of PDCCH candidates that are located in the first time unit and that are in a search space set corresponding to the second DCI as a second quantity of times of monitoring. In the first time unit, the terminal side device monitors, in the search space set corresponding to the second DCI based on the second quantity of times of monitoring, a PDCCH carrying the second DCI.

In this embodiment of this application, if determining that the first DCI does not meet the first condition, the terminal side device determines, according to a method in a conventional technology, a quantity of times of monitoring performed on the PDCCH in one time unit. For details, refer to the following process:

The terminal side device determines, based on a second condition, a third quantity of times, of monitoring, corresponding to H PDCCH candidates that are located in the first time unit and that are in the search space set corresponding to the first DCI, where H is an integer greater than 0.

If a first PDCCH candidate in the H PDCCH candidates and a second PDCCH candidate in L PDCCH candidates meet the second condition, the first PDCCH candidate and the second PDCCH candidate correspond to one time of monitoring; or if a first PDCCH candidate in the H PDCCH candidates and a second PDCCH candidate in L PDCCH candidates do not meet the second condition, the first PDCCH candidate and the second PDCCH candidate correspond to two times of monitoring. The first PDCCH candidate is any one of the H PDCCH candidates, the second PDCCH candidate is any one of the L PDCCH candidates, and L is an integer greater than 0. The L PDCCH candidates include a PDCCH candidate in the H PDCCH candidates except the first PDCCH candidate, and include PDCCH candidates that are located in the first time unit and that are in all search space sets whose priorities are less than the search space set corresponding to the first DCI.

It should be noted that a priority of the search space set may be determined based on an index value of the search space set, where a smaller index value of the search space set indicates a higher priority of the search space set. The index value of the search space set is a value used to identify the search space set, and is allocated by the network side device to the terminal side device. The second condition includes the following content: Two PDCCH candidates correspond to a same CCE set, that is, the two PDCCH candidates have a same aggregation level, and CCEs included in the two PDCCH candidates have a same start CCE location; the two PDCCH candidates have a same scrambling code sequence; the two PDCCH candidates are from a same control resource set (CORESET); and lengths of DCI obtained through monitoring performed by the terminal side device in the two PDCCH candidates are the same.

If determining that the third quantity of times of monitoring is less than or equal to a remaining maximum quantity of times of monitoring, in the first time unit, the terminal side device monitors, in the search space set corresponding to the first DCI based on the third quantity of times of monitoring, the PDCCH carrying the first DCI, where the remaining maximum quantity of times of monitoring is equal to a difference between a maximum second quantity of times of monitoring and a sum of quantities of times of monitoring corresponding to all search space sets whose priorities are greater than the search space set corresponding to the first DCI.

The maximum second quantity of times of monitoring may be greater than or equal to the maximum first quantity of times of monitoring.

Correspondingly, if determining that the third quantity of times of monitoring is greater than the remaining maximum quantity of times of monitoring, the terminal side device ignores the search space set corresponding to the first DCI, that is, no longer receives the first DCI, and does not monitor the PDCCH in the search space set corresponding to the first DCI.

For example, with reference to the foregoing descriptions, the network side device configures four search space sets for the terminal side device, the four search space sets are respectively a CSS #0, a CSS #1, a USS #1, and a USS #2, the CSS #0 and the CSS #1 are common search space sets, and the USS #1 and the USS #2 are user equipment specific search space sets. The CSS #0 and the CSS #1 are associated with a control resource set CORESET #0, where the CORESET #0 occupies two symbols in time domain, and occupies 24 resource blocks (RBs) in frequency domain. The USS #1 is associated with a control resource set CORESET #1, where the CORESET #1 occupies three symbols and occupies 12 RBs in frequency domain. The USS #2 is associated with a control resource set CORESET #2, where the CORESET #2 occupies one symbol in time domain, and occupies 16 CCEs in frequency domain. It is assumed that a maximum quantity of times, of monitoring, configured by the network side device for the terminal side device in one time unit is 44, and a maximum quantity of CCEs is 56.

It is assumed that for the CSS #0, the terminal side device determines that a quantity of times, of monitoring, corresponding to a PDCCH candidate in the CSS #0 is 14. The CSS #0 occupies eight CCEs on the symbol #0, but occupies eight CCEs on the symbol #7. Because of different monitoring occasions, even though both the CSS #0 and the CSS #1 are associated with the CORESET #0, it is considered that the CSS #0 occupies non-overlapping CCEs on the symbol #0 and the symbol #7, and it is determined that the PDCCH candidate in the CSS #0 includes 16 non-overlapping CCEs, that is, 8+8=16.

For the CSS #1, the terminal side device determines that a quantity of times, of monitoring, corresponding to a PDCCH candidate in the CSS #1 is 2. The CSS #1 occupies eight CCEs on the symbol #0, a monitoring occasion of the CSS #1 and a monitoring occasion of the CSS #0 are on the same symbol #0, both the CSS #1 and the CSS #0 are associated with the CORESET #0, CCEs occupied by the CSS #1 and the CSS #0 completely overlap, and a quantity of non-overlapping CCEs occupied by the CSS #1 is counted into the CSS #0. Therefore, it may be determined that the PDCCH candidate in the CSS #1 includes zero non-overlapping CCEs.

A sum of the quantities of times, of monitoring, respectively corresponding to the CSS #0 and the CSS #1 is 14+2=16, and a sum of the quantities of non-overlapping CCEs that are occupied is 16. It is assumed that a maximum quantity of times of monitoring is 44 and a maximum quantity of CCEs is 56. The sum of the quantities of times, of monitoring, respectively occupied by the CSS #0 and the CSS #1 is subtracted from the maximum quantity of times of monitoring, to obtain a remaining maximum quantity of times, of monitoring, corresponding to the USS #1, and the sum of the quantities of non-overlapping CCEs is subtracted from the maximum quantity of CCEs, to obtain a remaining maximum quantity, of CCEs, corresponding to the USS #1. That is, the remaining maximum quantity of times, of monitoring, corresponding to the USS #1 is 44−16=28, and the remaining maximum quantity, of CCEs, corresponding to the USS #1 is 56−16=40.

For the USS #1, the terminal side device determines that a quantity of times, of monitoring, corresponding to a PDCCH candidate in the USS #1 is 16. The USS #1 occupies 12 CCEs on the symbol #0. Although a monitoring occasion of the USS #1 and the monitoring occasions of the CSS #0 and the CSS #1 are on the same symbol #0, the USS #1 is associated with the CORESET #1, which is different from the CORESET #0. Therefore, 12 non-overlapping CCEs are separately calculated. In this way, the terminal side device determines that the PDCCH candidate in the USS #1 occupies 12 non-overlapping CCEs.

The terminal side device determines that a quantity of times, of monitoring, corresponding to the USS #1 is less than 28, and a quantity, of non-overlapping CCEs, corresponding to the USS #1 is less than 40. Therefore, the quantity of times, of monitoring, occupied by the USS #1 is subtracted from the remaining maximum quantity of times, of monitoring, corresponding to the US S #1, to obtain a maximum quantity of times, of monitoring, corresponding to the USS #2. That is, the maximum quantity of times, of monitoring, corresponding to the USS #2 is 28−16=12. The quantity, of non-overlapping CCEs, corresponding to the USS #1 is subtracted from the remaining maximum quantity, of CCEs, corresponding to the USS #1, to obtain a remaining maximum quantity, of CCEs, corresponding to the USS #2. That is, the remaining maximum quantity, of CCEs, corresponding to the USS #2 is 40−12=28.

For the USS #2, the terminal side device determines that a quantity of times, of monitoring, corresponding to a PDCCH candidate in the USS #2 is 3*7=21. It is determined that the PDCCH candidate in the USS #2 occupies 16*7=112 non-overlapping CCEs.

The terminal side device determines that a quantity of times, of monitoring, corresponding to the USS #2 is greater than the maximum quantity of times, of monitoring, corresponding to the USS #2, and a quantity, of non-overlapping CCEs, corresponding to the USS #2 is greater than the remaining maximum quantity, of CCEs, corresponding to the USS #2. In this way, a configuration of the USS #2 is deleted, that is, corresponding PDCCHs are monitored only in the CSS #0, the CSS #1, and the USS #1.

It should be noted that, when determining that the first DCI meets a third condition, the terminal side device may further determine, according to a method in the NR Rel-15 technology, a quantity of times of monitoring performed on a PDCCH in one time unit, where the third condition includes one or more of the following:

First: The search space set corresponding to the first DCI has less than or equal to one monitoring occasion in preset duration.

Second: The search space set corresponding to the first DCI has more than one monitoring occasion in preset duration, a control resource associated with the search space set corresponding to the first DCI is distributed in P symbols in the preset duration, and the first DCI overlaps, in Q of the P symbols, control resources associated with search space sets corresponding to all other DCI of the terminal side device.

Third: The first DCI is not specified DCI.

Fourth: The terminal side device receives a second instruction from the network side device, where the second instruction is used to instruct the terminal side device to determine, according to a method in a conventional technology and based on a second condition, a quantity of times of monitoring performed on a PDCCH in one time unit, and determine whether the determined quantity of times of monitoring exceeds a maximum second quantity of times of monitoring.

Fifth: In one time unit, a quantity of times, of monitoring, configured by the terminal side device for the first DCI is greater than a maximum second quantity of times of monitoring, or a quantity, of non-overlapping CCEs used for channel estimation, configured for the first DCI is greater than a maximum second quantity of CCEs.

Sixth: In one time unit, a quantity of times, of monitoring, configured by the terminal side device for all to-be-monitored DCI in the time unit is greater than a maximum quantity of times, of monitoring, specified in a protocol, or a quantity, of non-overlapping CCEs used for channel estimation, configured for all DCI is greater than a maximum quantity, of CCEs, specified in a protocol.

In another possible implementation, in this embodiment of this application, when configuring a search space set and a control resource set associated with the search space set for DCI, the network side device may further use a corresponding rule to reduce a quantity of PDCCH candidates that meet the second condition with another PDCCH candidate and that are in the search space set, so that complexity of determining, by the terminal side device based on a second condition, a quantity of times of monitoring performed on a PDCCH can be reduced, and power consumption of the terminal side device can be reduced. The following provides detailed descriptions.

Figure 4:
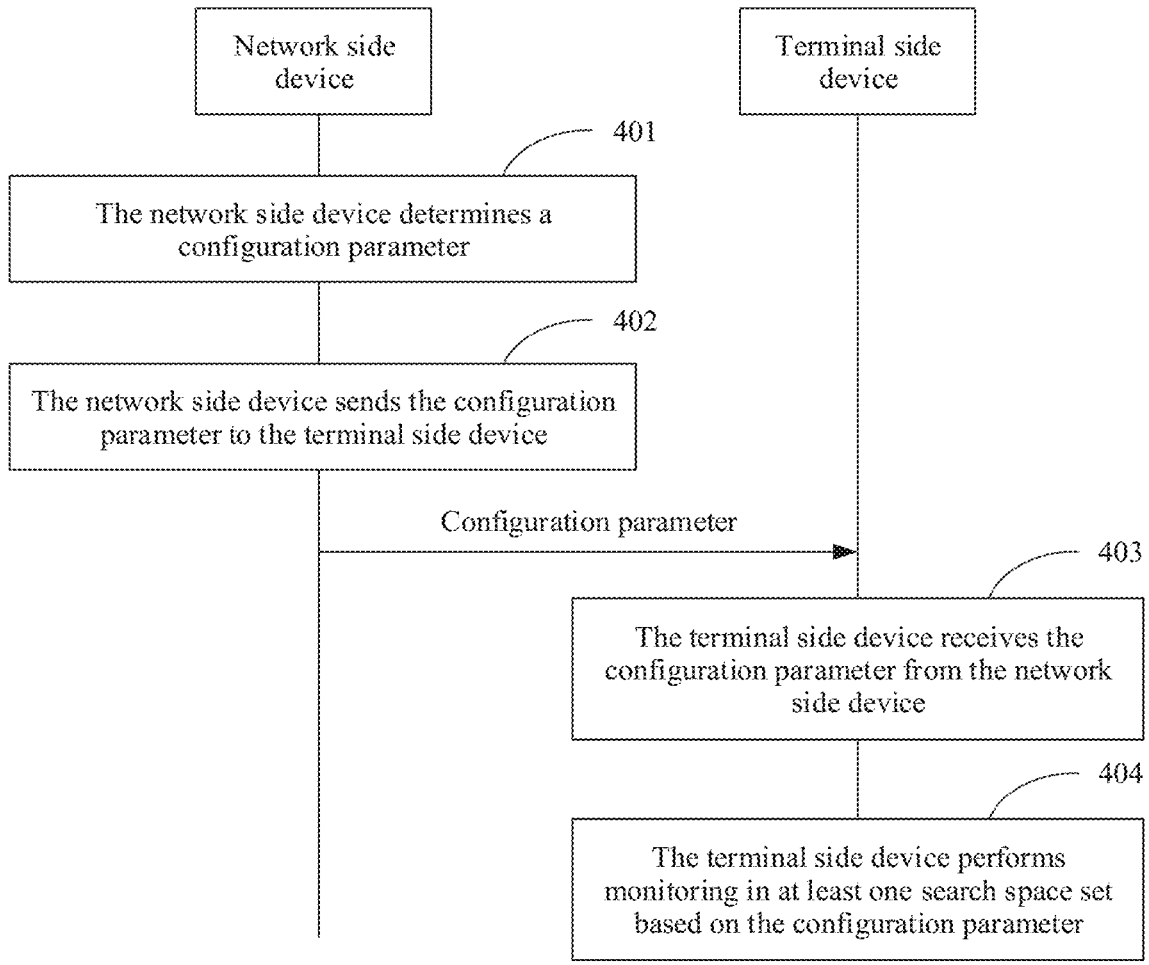
FIG. 4 is a schematic flowchart of a communication method according to an embodiment of this application.

FIG. 4 is a schematic flowchart of a communication method according to an embodiment of this application. The method includes the following steps.

Step 401: A network side device determines a configuration parameter.

The configuration parameter is used to configure at least one search space set and a control resource set associated with each of the at least one search space set.

Step 402: The network side device sends the configuration parameter to a terminal side device.

Step 403: The terminal side device receives the configuration parameter from the network side device.

Step 404: The terminal side device performs monitoring in the at least one search space set based on the configuration parameter.

In the at least one search space set, a quantity of search space sets associated with a same control resource set is less than or equal to M, and the search space sets associated with the same control resource set have a same monitoring occasion, where M is an integer greater than 0, M is less than N, and N is a maximum quantity, of search space sets, configured on a same bandwidth part of a same cell. The maximum quantity N may be predefined in a protocol, or configured by the network side device based on each bandwidth part configured for the terminal side device in the same cell.

For example, a value of N is 10.

In a conventional technology, the search space sets associated with the same control resource set are likely to meet a second condition. Therefore, the terminal side device may need to determine, based on the second condition, a quantity of times of monitoring for any two PDCCH candidates in the search space sets associated with the same control resource set. Currently, in a conventional technology, a maximum quantity of search space sets associated with the same control resource set may be equal to N. When planning algorithm complexity, the terminal side device needs to reserve, based on the maximum quantity N, resources for control channel monitoring. When N is equal to 10, the complexity is very high. However, according to the foregoing method, by limiting the quantity of search space sets associated with the same control resource set to M, a quantity of times, of monitoring, corresponding to a quantity of PDCCH candidates, that needs to be determined based on the second condition in one control resource set can be reduced, thereby reducing complexity of the terminal side device.

For example, based on the foregoing condition, for search space sets corresponding to DCI with a same length, a quantity of search space sets associated with a same control resource set may be further limited to be less than or equal to M, and the search space sets associated with the same control resource set have a same monitoring occasion, where M is an integer greater than 0, M is less than N, and N is a maximum quantity, of search space sets, configured on a same bandwidth part of a same cell. In a conventional technology, the second condition includes four pieces of content, one of which is to determine that lengths of DCI obtained through monitoring performed by the terminal side device in two PDCCH candidates are the same. By limiting a quantity of search space sets that correspond to the DCI with the same length and that are associated with the same control resource set, a quantity of times, of monitoring, corresponding to a quantity of PDCCH candidates, that needs to be determined based on the second condition in one control resource set can be reduced, thereby reducing the complexity of the terminal side device.

During actual implementation of the foregoing restriction, there may be at least two implementations.

Implementation 1: It is directly limited in the protocol that the network side device is not allowed to configure a quantity of search space sets associated with a same control resource set to be greater than M.

Implementation 2: The network side device may arbitrarily configure a quantity of search space sets associated with a same control resource set, but for search space sets associated with a same control resource set and have a same monitoring occasion, the terminal side device monitors DCI with a same length in at most N search space sets. The following criteria may be used for selecting the N search space sets:

Criterion 1: In all search space sets that are associated with the same control resource set and that have the same monitoring occasion, monitor PDCCH candidates in N search space sets that each have a largest AL.

A larger AL indicates that the PDCCH candidate occupies more physical resources, and indicates better receiving performance of control information carried on the PDCCH candidate. Therefore, a search space set that has a large AL needs to be monitored as much as possible.

Criterion 2: Monitor PDCCH candidates in N search space sets that each have a smallest index value.

Each search space set has a corresponding index value, and N search space sets that have smallest index values may be selected based on the index value.

Criterion 3: Monitor PDCCH candidates in N search space sets that each have a largest quantity of PDCCH candidates.

In this embodiment of this application, the foregoing restriction on the configuration parameter may alternatively be replaced with another restriction. In a possible implementation, the restriction may be the following condition: In the at least one search space set, monitoring occasions of all search space sets that are associated with a same control resource set and that each have more than one monitoring occasion in a preset time interval do not overlap in time domain. A value of the preset time interval may be determined based on an actual situation. For example, a value of the preset time interval is one slot. In this case, the search space set has more than one monitoring occasion in one slot, and the search space set may also be referred to as a search space set for non-slot-based scheduling.

Because for a search space set that has more than one monitoring occasion in one preset time interval, the monitoring occasions appear at a plurality of locations in the preset time interval, and the locations are relatively flexible, if limitation is performed based on the foregoing condition, the locations of the monitoring occasions may be limited, thereby reducing complexity of monitoring performed by the terminal side device.

Further, it may be specified that a quantity of search space sets that are associated with a same control resource set and that each have more than one monitoring occasion in the preset time interval is less than or equal to a threshold. A value of the threshold may be determined based on the actual situation. For example, the value of the threshold is 1.

In a possible implementation, the restriction may be the following condition: In the at least one search space set, a total quantity of PDCCH candidates included in each search space set is less than a first preset quantity.

A value of the first preset quantity may be directly provided in a protocol, or a table including a plurality of values that is provided in a protocol. Different values of the first preset quantity are mapped into the table based on a quantity of RBs occupied by the control resource set. The quantity of RBs occupied by the control resource set is configured by a network according to the existing protocol.

In a possible implementation, the restriction may alternatively be the following condition: In the at least one search space set, a total quantity of PDCCH candidates included in each search space set at each aggregation level is less than a second preset quantity, and second preset quantities corresponding to different aggregation levels may be the same or different.

Similarly, a value of the second preset quantity may be directly provided in a protocol, or a table including a plurality of values that is provided in a protocol. Different values of the second preset quantity are mapped into the table based on a quantity of RBs occupied by the control resource set.

In this embodiment of this application, the network side device may further directly indicate, by using higher layer signaling, the terminal side device not to determine, based on a second condition, a quantity of times of monitoring performed on a PDCCH candidate in a common search space set (CSS set) or a PDCCH candidate in a user equipment specific search space set (USS set). This is equivalent to reducing a quantity of PDCCH candidates to be compared when the quantity of times of monitoring is determined based on the second condition.

For example, the following process may be included.

The network side device determines first indication information.

The network side device sends the first indication information to the terminal side device.

The terminal side device receives the first indication information from the network side device.

The terminal side device determines, based on the first indication information, a quantity of times of monitoring.

The first indication information is used to indicate the terminal side device not to perform a first operation on any PDCCH candidate in the common search space set or any PDCCH candidate in the user equipment specific search space set, where the first operation is used to determine, based on the second condition, a quantity of times, of monitoring, corresponding to two PDCCH candidates.

If the two PDCCH candidates meet the second condition, the two PDCCH candidates correspond to one time of monitoring. Alternatively, if the two PDCCH candidates do not meet the second condition, the two PDCCH candidates correspond to two times of monitoring. When the two PDCCH candidates correspond to one time of monitoring, the two PDCCH candidates meet the second condition, and monitoring a PDCCH candidate resource only once by the terminal side device is equivalent to monitoring the two PDCCH candidates. When the two PDCCH candidates correspond to two times of monitoring, the terminal side device needs to separately monitor resources associated with the two PDCCH candidates provided that the two PDCCH candidates do not meet any content in the second condition.

Further, a maximum quantity of USSs in each BWP and a maximum quantity of CSSs in the BWP may be specified, thereby reducing a quantity of PDCCH candidates to be compared when a quantity of times of monitoring is determined based on the second condition.

Figure 5:
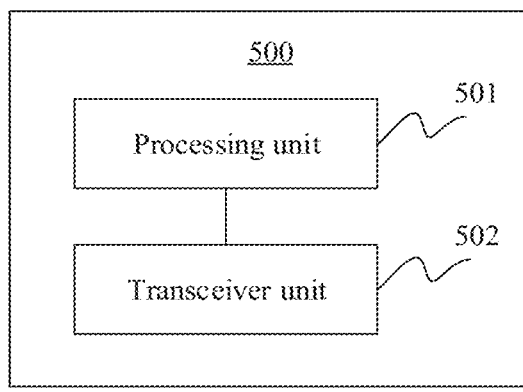
FIG. 5 is a schematic diagram of a structure of a communication apparatus according to an embodiment of this application.

FIG. 5 is a schematic diagram of a structure of a communication apparatus according to an embodiment of this application. The communication apparatus may be configured to perform actions of the terminal side device in the foregoing method embodiments, and the communication apparatus 500 includes a processing unit 501 and a transceiver unit 502.

When the communication apparatus 500 performs the actions of the terminal side device in the procedure shown in FIG. 2,
  the processing unit 501 is configured to: if determining that first downlink control information (DCI) meets a first condition, use, by the terminal side device, a quantity of PDCCH candidates that are located in a first time unit and that are in a search space set corresponding to the first DCI as a first quantity of times of monitoring; and
  the transceiver unit 502 is configured to: in the first time unit, monitor, by the terminal side device in the search space set corresponding to the first DCI based on the first quantity of times of monitoring, a PDCCH carrying the first DCI, where
  the first condition includes one or more of the following:
  the search space set corresponding to the first DCI has more than one monitoring occasion in preset duration;
  the search space set corresponding to the first DCI has more than one monitoring occasion in preset duration, a control resource associated with the search space set corresponding to the first DCI is distributed in P symbols in the preset duration, and the first DCI does not overlap, in Q of the P symbols, control resources associated with search space sets corresponding to all other DCI of the terminal side device, where P is an integer greater than 0, and Q is less than or equal to P; or
  the first DCI is specified DCI; and
  receive a first instruction from a network side device, where the first instruction is used to instruct the terminal side device to use a quantity of PDCCH candidates included in a search space set corresponding to to-be-received DCI as a quantity of times of monitoring performed on a PDCCH carrying the DCI.

In a possible implementation, the specified DCI is DCI scrambled by using a specified radio network temporary identifier (RNTI);
  the specified DCI is DCI including a priority indication field;
  the specified DCI is DCI in a specified format; or
  the specified DCI is DCI including a specified quantity of bits.

In a possible implementation, the processing unit 501 is further configured to:
for second DCI, where the second DCI is any DCI in G pieces of to-be-received DCI except the first DCI, and G is an integer greater than 1, use a quantity of PDCCH candidates that are located in the first time unit and that are in a search space set corresponding to the second DCI as a second quantity of times of monitoring.

The transceiver unit 502 is further configured to: in the first time unit, monitor, in the search space set corresponding to the second DCI based on the second quantity of times of monitoring, a PDCCH carrying the second DCI.

In a possible implementation, the transceiver unit 502 is further configured to: when monitoring, in the search space set corresponding to the first DCI based on the first quantity of times of monitoring, the PDCCH carrying the first DCI, ignore whether the first quantity of times of monitoring is greater than a maximum first quantity of times of monitoring.

In a possible implementation, the transceiver unit 502 is further configured to:
  when monitoring, in the search space set corresponding to the first DCI based on the first quantity of times of monitoring, the PDCCH carrying the first DCI, ignore whether a quantity of non-overlapping control channel elements (CCEs) used for performing channel estimation on the PDCCH carrying the first DCI is greater than a maximum first quantity of CCEs.

In a possible implementation, the processing unit 501 is further configured to:
  if determining that the first DCI does not meet the first condition, determine, based on a second condition, a third quantity of times, of monitoring, corresponding to H PDCCH candidates that are located in the first time unit and that are in the search space set corresponding to the first DCI, where H is an integer greater than 0.

If a first PDCCH candidate in the H PDCCH candidates and a second PDCCH candidate in L PDCCH candidates meet the second condition, the first PDCCH candidate and the second PDCCH candidate correspond to one time of monitoring; or if a first PDCCH candidate in the H PDCCH candidates and a second PDCCH candidate in L PDCCH candidates do not meet the second condition, the first PDCCH candidate and the second PDCCH candidate correspond to two times of monitoring. The first PDCCH candidate is any one of the H PDCCH candidates, the second PDCCH candidate is any one of the L PDCCH candidates, and L is an integer greater than 0. The L PDCCH candidates include a PDCCH candidate in the H PDCCH candidates except the first PDCCH candidate, and include PDCCH candidates that are located in the first time unit and that are in all search space sets whose priorities are less than the search space set corresponding to the first DCI.

The transceiver unit 502 is further configured to: if determining that the third quantity of times of monitoring is less than or equal to a remaining maximum quantity of times of monitoring, in the first time unit, monitor, in the search space set corresponding to the first DCI based on the third quantity of times of monitoring, the PDCCH carrying the first DCI.

The remaining maximum quantity of times of monitoring is equal to a difference between a maximum second quantity of times of monitoring and a sum of quantities of times, of monitoring, corresponding to all search space sets whose priorities are greater than the search space set corresponding to the first DCI.

In a possible implementation, the transceiver unit 502 is further configured to: if determining that the third quantity of times of monitoring is greater than the remaining maximum quantity of times of monitoring, ignore the search space set corresponding to the first DCI.

When the communication apparatus 500 performs the actions of the terminal side device in the procedure shown in FIG. 4, the processing unit 501 is configured to determine a configuration parameter, where the configuration parameter is used to configure at least one search space set and a control resource set associated with each of the at least one search space set; and in the at least one search space set, a quantity of search space sets associated with a same control resource set is less than or equal to M, and the search space sets associated with the same control resource set have a same monitoring occasion, where M is an integer greater than 0, M is less than N, and N is a maximum quantity, of search space sets, configured on a same bandwidth part of a same cell; and the transceiver unit 502 is configured to send the configuration parameter to the terminal side device.

In a possible implementation, in the at least one search space set, lengths of downlink control information (DCI) corresponding to all search space sets associated with the same control resource set are the same.

Figure 6:
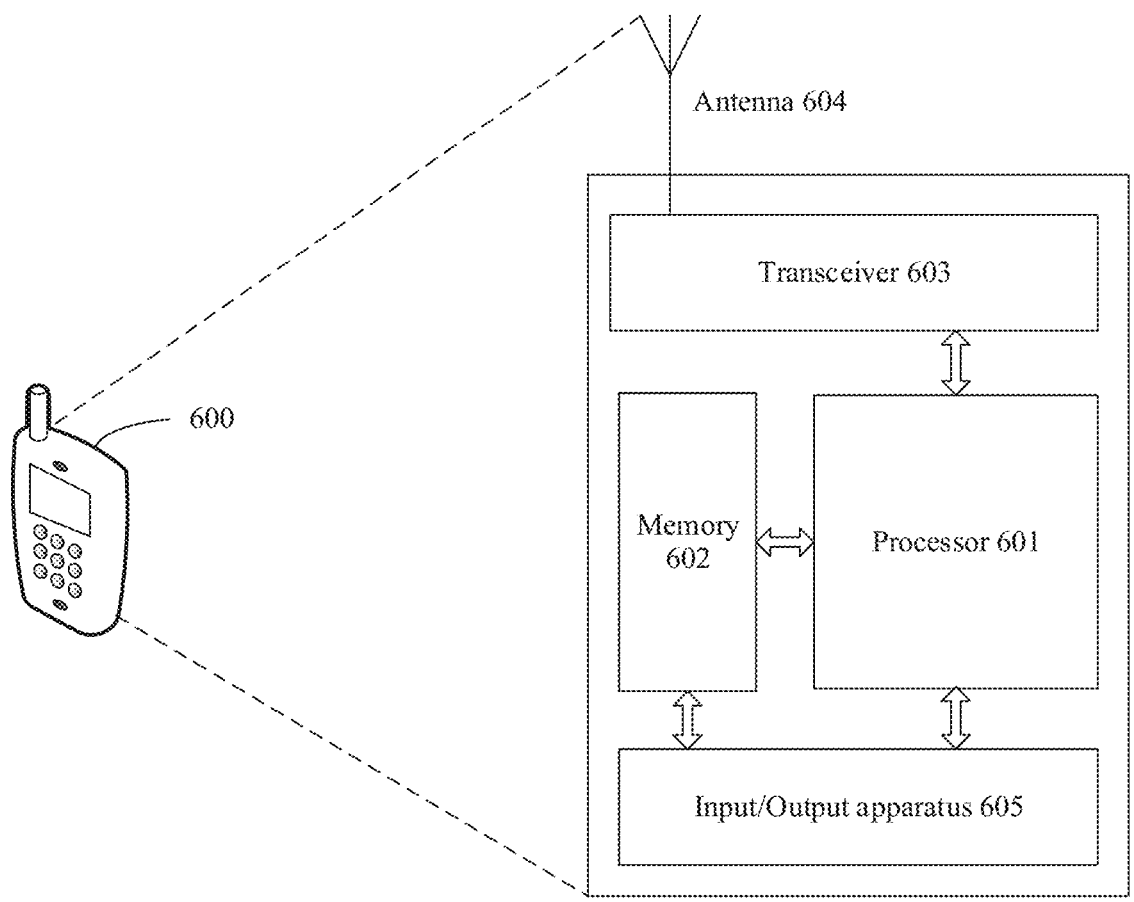
FIG. 6 is a schematic diagram of a structure of a communication apparatus according to an embodiment of this application.

FIG. 6 is a schematic diagram of a structure of a communication apparatus according to an embodiment of this application. The communication apparatus shown in FIG. 6 may be an implementation of a hardware circuit of the communication apparatus shown in FIG. 5. The communication apparatus is applicable to the flowchart shown in FIG. 2 or in FIG. 4, and may perform functions of the terminal side device in the foregoing method embodiments. For ease of description, FIG. 6 shows only main components of the communication apparatus. Optionally, the communication apparatus may be a terminal side device, or may be an apparatus, for example, a chip or a chip system, in the terminal side device. The chip system includes at least one chip, and the chip system may further include another circuit structure and/or discrete component. Optionally, that the communication apparatus is the terminal side device is used as an example. As shown in FIG. 6, the communication apparatus 600 includes a processor 601, a memory 602, a transceiver 603, an antenna 604, and an input/output apparatus 605. The processor 601 is mainly configured to: process a communication protocol and communication data; control the entire wireless communication apparatus; execute a software program; and process data of the software program. For example, the processor 601 is configured to support the wireless communication apparatus in performing actions described in the foregoing method embodiment. The memory 602 is mainly configured to store a software program and data. The transceiver 603 is mainly configured to: perform conversion between a baseband signal and a radio frequency signal and processing of the radio frequency signal. The antenna 604 is mainly configured to receive and send a radio frequency signal in a form of an electromagnetic wave. The input/output apparatus 605, such as a touchscreen, a display screen, or a keyboard, is mainly configured to: receive data input by a user and output data to the user.

For specific functions of the communication apparatus 600 shown in FIG. 6, refer to descriptions in the procedure shown in FIG. 2 or FIG. 4. Details are not described herein again.

Figure 7:
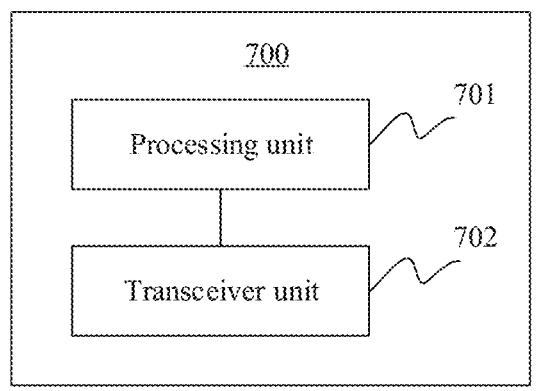
FIG. 7 is a schematic diagram of a structure of a communication apparatus according to an embodiment of this application.

FIG. 7 is a schematic diagram of a structure of a communication apparatus according to an embodiment of this application. The communication apparatus may be configured to perform actions of the network side device in the foregoing method embodiments, and the communication apparatus 700 includes a processing unit 701 and a transceiver unit 702.

When the communication apparatus 700 performs the actions of the network side device in the procedure shown in FIG. 2, the processing unit 701 is configured to: generate first downlink control information (DCI) that meets a first condition, where a quantity of PDCCH candidates that are located in a first time unit and that are in a search space set corresponding to the first DCI is equal to a first quantity of times of monitoring performed by a terminal side device on a PDCCH carrying the first DCI in the first time unit; and the first condition includes one or more of the following:

the search space set corresponding to the first DCI has more than one monitoring occasion in preset duration;

the search space set corresponding to the first DCI has more than one monitoring occasion in preset duration, a control resource associated with the search space set corresponding to the first DCI is distributed in P symbols in the preset duration, and the first DCI does not overlap, in Q of the P symbols, control resources associated with search space sets corresponding to all other DCI of the terminal side device, where P is an integer greater than 0, and Q is less than or equal to P; or the first DCI is specified DCI; and send a first instruction to the terminal side device before generating the first DCI, where the first instruction is used to instruct the terminal side device to use a quantity of PDCCH candidates included in a search space set corresponding to to-be-received DCI as a quantity of times of monitoring performed on a PDCCH carrying the DCI; and the transceiver unit 702 is configured to send the first DCI on the PDCCH.

In a possible implementation, the first quantity of times of monitoring is less than or equal to a maximum first quantity of times of monitoring.

In a possible implementation, a quantity of non-overlapping control channel elements (CCEs) used for performing channel estimation on the PDCCH carrying the first DCI is less than or equal to a maximum first quantity of CCEs.

When the communication apparatus 700 performs the actions of the network side device in the procedure shown in FIG. 4, the transceiver unit 702 is configured to receive a configuration parameter from the network side device, where the configuration parameter is used to configure at least one search space set and a control resource set associated with each of the at least one search space set; and in the at least one search space set, a quantity of search space sets associated with a same control resource set is less than or equal to M, and the search space sets associated with the same control resource set have a same monitoring occasion, where M is an integer greater than 0, M is less than N, and N is a maximum quantity, of search space sets, configured on a same bandwidth part of a same cell; and the processing unit 701 is configured to perform monitoring in the at least one search space set based on the configuration parameter.

In a possible implementation, in the at least one search space set, lengths of downlink control information (DCI)

corresponding to all search space sets associated with the same control resource set are the same.

Figure 8:
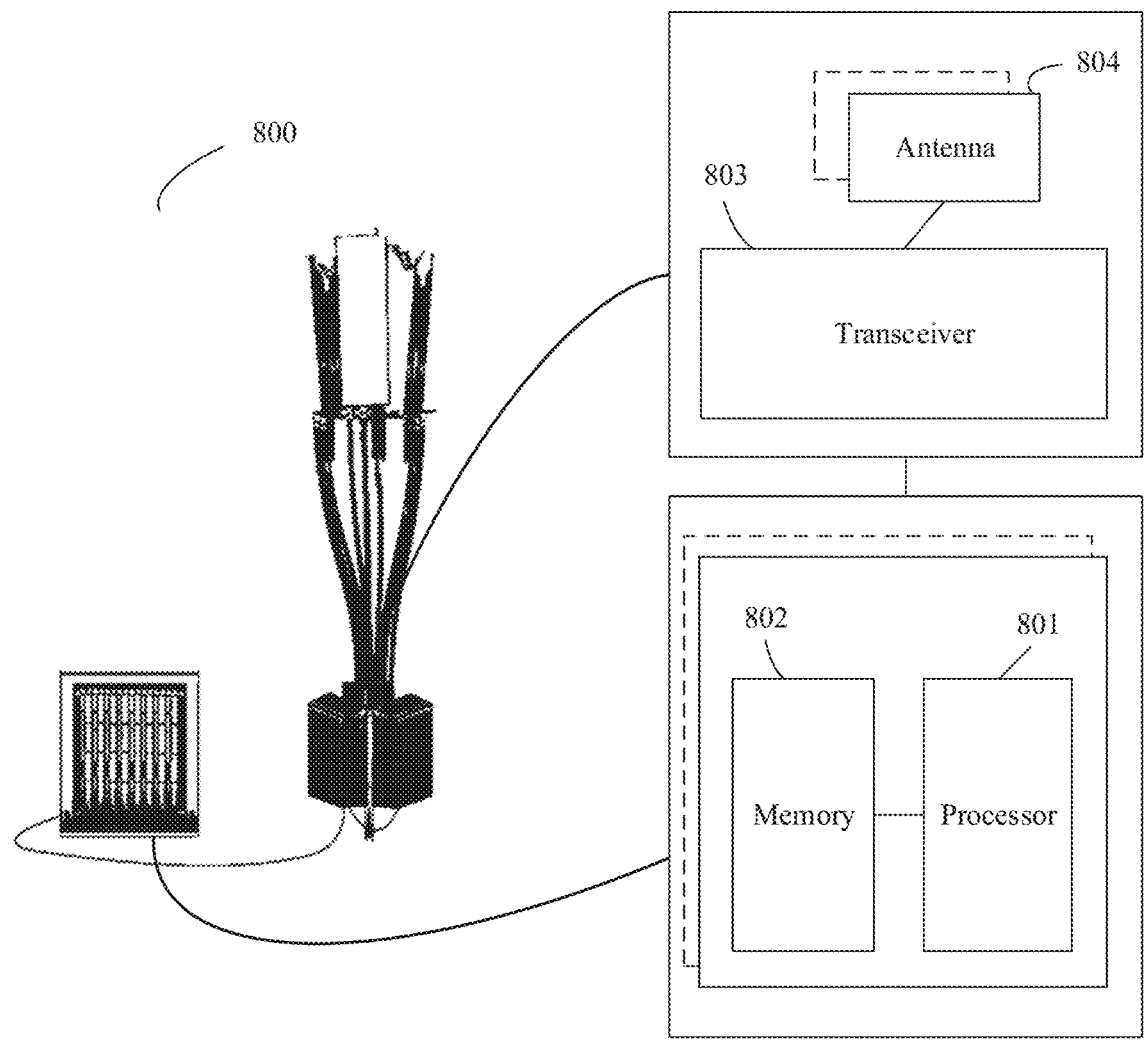
FIG. 8 is a schematic diagram of a structure of a communication apparatus according to an embodiment of this application.

FIG. 8 is a schematic diagram of a structure of a communication apparatus according to an embodiment of this application. The communication apparatus shown in FIG. 8 may be an implementation of a hardware circuit of the communication apparatus shown in FIG. 7. The communication apparatus is applicable to the flowchart shown in FIG. 2 or in FIG. 4, and may perform functions of the network side device in the foregoing method embodiments. For ease of description, FIG. 8 shows only main components of the communication apparatus. Optionally, the communication apparatus may be a network side device, or may be an apparatus, for example, a chip or a chip system, in the network side device. The chip system includes at least one chip, and the chip system may further include another circuit structure and/or discrete component. Optionally, that the communication apparatus is the network side device is used as an example. As shown in FIG. 8, the communication apparatus 800 includes a processor 801, a memory 802, a transceiver 803, an antenna 804, and the like.

For specific functions of the communication apparatus 800 shown in FIG. 8, refer to descriptions in the procedure shown in FIG. 2 or FIG. 4. Details are not described herein again.

A person skilled in the art should understand that the embodiments of this application may be provided as a method, a system, or a computer program product. Therefore, this application may use a form of a hardware-only embodiment, a software-only embodiment, or an embodiment with a combination of software and hardware. In addition, this application may use a form of a computer program product that is implemented on one or more computer-usable storage media (including but not limited to a disk memory, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of another programmable data processing device generate an apparatus for implementing a specific function in one or more processes in the flowcharts and/or in one or more blocks in the block diagrams.

The computer program instructions may be stored in a computer readable memory that can instruct the computer or another programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

Obviously, a person skilled in the art can make various modifications and variations to this application without departing from the scope of this application. This application is intended to cover the modifications and variations of this application provided that they fall within the scope of the following claims and equivalent technologies of this application.

What is claimed is:

1. A communication method, comprising:
when a terminal side device determines that first downlink control information (DCI) meets a first condition, using, by the terminal side device, a quantity of physical downlink control channel (PDCCH) candidates that are located in a first time unit and that are in a search space set corresponding to the first DCI as a first quantity of times of monitoring;
in the first time unit, monitoring, by the terminal side device in the search space set corresponding to the first DCI based on the first quantity of times of monitoring, a PDCCH carrying the first DCI, wherein the first condition comprises one or more of the following:
the search space set corresponding to the first DCI has more than one monitoring occasion in preset duration;
the search space set corresponding to the first DCI has more than one monitoring occasion in preset duration, a control resource associated with the search space set corresponding to the first DCI is distributed in P symbols in the preset duration, and the first DCI does not overlap, in Q of the P symbols, control resources associated with search space sets corresponding to all other DCI of the terminal side device, wherein P is an integer greater than 0, and Q is less than or equal to P; or
the first DCI is a specified DCI;
in response to determining that the first DCI does not meet the first condition, determining, by the terminal side device based on a second condition, a third quantity of times of monitoring that are corresponding to H PDCCH candidates that are located in the first time unit and that are in the search space set corresponding to the first DCI, wherein H is an integer greater than 0;
in response to determining that the third quantity of times of monitoring is less than or equal to a remaining maximum quantity of times of monitoring, monitoring, in the first time unit by the terminal side device in the search space set corresponding to the first DCI based on the third quantity of times of monitoring, the PDCCH carrying the first DCI; and
receiving, by the terminal side device, a first instruction from a network side device, wherein the first instruction is used to instruct the terminal side device to use a quantity of PDCCH candidates comprised in a search space set corresponding to to-be-received DCI as a quantity of times of monitoring performed on a PDCCH carrying the to-be-received DCI.

2. The communication method according to claim 1, wherein:
the specified DCI is DCI that is scrambled by using a specified radio network temporary identifier (RNTI);
the specified DCI is DCI comprising a priority indication field;
the specified DCI is DCI in a specified format; or
the specified DCI is DCI comprising a specified quantity of bits.

3. The communication method according to claim 1, wherein:
second DCI is any DCI in G pieces of DCI to be received by the terminal side device except the first DCI, and G is an integer greater than 1; and
the communication method comprises:
using, by the terminal side device, a quantity of PDCCH candidates that are located in the first time unit and that are in a search space set corresponding to the second DCI as a second quantity of times of monitoring; and in the first time unit, monitoring, by the terminal side device, in the search space set corresponding to the second DCI based on the second quantity of times of monitoring, a PDCCH carrying the second DCI.

4. The communication method according to claim 1, wherein the communication method comprises:
when monitoring, in the search space set corresponding to the first DCI based on the first quantity of times of monitoring, the PDCCH carrying the first DCI,
ignoring, by the terminal side device, whether the first quantity of times of monitoring is greater than a maximum first quantity of times of monitoring.

5. The communication method according to claim 1, wherein the communication method comprises:
when monitoring, in the search space set corresponding to the first DCI based on the first quantity of times of monitoring, the PDCCH carrying the first DCI,
ignoring, by the terminal side device, whether a quantity of non-overlapping control channel elements (CCEs) used for performing channel estimation on the PDCCH carrying the first DCI is greater than a maximum first quantity of CCEs.

6. The communication method according to claim 1, wherein:
when a first PDCCH candidate in the H PDCCH candidates and a second PDCCH candidate in L PDCCH candidates meet the second condition, the first PDCCH candidate and the second PDCCH candidate correspond to one time of monitoring; or
when a first PDCCH candidate in the H PDCCH candidates and a second PDCCH candidate in L PDCCH candidates do not meet the second condition,
the first PDCCH candidate and the second PDCCH candidate correspond to two times of monitoring;
the first PDCCH candidate is any one of the H PDCCH candidates, the second PDCCH candidate is any one of the L PDCCH candidates, and L is an integer greater than 0; and
the L PDCCH candidates comprise a PDCCH candidate in the H PDCCH candidates except the first PDCCH candidate, and comprise PDCCH candidates that are located in the first time unit and that are in all search space sets whose priorities are less than the search space set corresponding to the first DCI; and
the remaining maximum quantity of times of monitoring is equal to a difference between a maximum second quantity of times of monitoring and a sum of quantities of times of monitoring that are corresponding to all search space sets whose priorities are greater than the search space set corresponding to the first DCI.

7. The communication method according to claim 6, wherein the communication method comprises:
when determining that the third quantity of times of monitoring is greater than the remaining maximum quantity of times of monitoring, ignoring, by the terminal side device, the search space set corresponding to the first DCI.

8. A terminal side device, comprising:
at least one processor; and
one or more memories coupled to the at least one processor storing instructions for execution by the at least one processor to perform operations comprising:
when the terminal side device determines that first downlink control information (DCI) meets a first condition, using a quantity of physical downlink control channel (PDCCH) candidates that are located in a first time unit and that are in a search space set corresponding to the first DCI as a first quantity of times of monitoring;
in the first time unit, monitoring in the search space set corresponding to the first DCI based on the first quantity of times of monitoring, a PDCCH carrying the first DCI, wherein the first condition comprises one or more of the following:
the search space set corresponding to the first DCI has more than one monitoring occasion in preset duration;
the search space set corresponding to the first DCI has more than one monitoring occasion in preset duration, a control resource associated with the search space set corresponding to the first DCI is distributed in P symbols in the preset duration, and the first DCI does not overlap, in Q of the P symbols, control resources associated with search space sets corresponding to all other DCI of the terminal side device, wherein P is an integer greater than 0, and Q is less than or equal to P; or
the first DCI is a specified DCI;
in response to determining that the first DCI does not meet the first condition, determining, by the terminal side device based on a second condition, a third quantity of times of monitoring that are corresponding to H PDCCH candidates that are located in the first time unit and that are in the search space set corresponding to the first DCI, wherein H is an integer greater than 0;
in response to determining that the third quantity of times of monitoring is less than or equal to a remaining maximum quantity of times of monitoring, monitoring, in the first time unit by the terminal side device in the search space set corresponding to the first DCI based on the third quantity of times of monitoring, the PDCCH carrying the first DCI; and
receiving a first instruction from a network side device, wherein the first instruction is used to instruct the terminal side device to use a quantity of PDCCH candidates comprised in a search space set corresponding to to-be-received DCI as a quantity of times of monitoring performed on a PDCCH carrying the to-be-received DCI.

9. The terminal side device according to claim 8, wherein:
the specified DCI is DCI that is scrambled by using a specified radio network temporary identifier (RNTI);
the specified DCI is DCI comprising a priority indication field;
the specified DCI is DCI in a specified format; or
the specified DCI is DCI comprising a specified quantity of bits.

10. The terminal side device according to claim 8, wherein second DCI is any DCI in G pieces of DCI to be received by the terminal side device except the first DCI, and G is an integer greater than 1; and
the operations comprise:
using, by the terminal side device, a quantity of PDCCH candidates that are located in the first time unit and that are in a search space set corresponding to the second DCI as a second quantity of times of monitoring; and in the first time unit, monitoring, by the terminal side device, in the search space set corresponding to the second DCI based on the second quantity of times of monitoring, a PDCCH carrying the second DCI.

11. The terminal side device according to claim 8, wherein the operations comprise:
when monitoring, in the search space set corresponding to the first DCI based on the first quantity of times of monitoring, the PDCCH carrying the first DCI,
ignoring, by the terminal side device, whether the first quantity of times of monitoring is greater than a maximum first quantity of times of monitoring.

12. The terminal side device according to claim 8, wherein the operations comprise:
when monitoring, in the search space set corresponding to the first DCI based on the first quantity of times of monitoring, the PDCCH carrying the first DCI,
ignoring, by the terminal side device, whether a quantity of non-overlapping control channel elements (CCEs) used for performing channel estimation on the PDCCH carrying the first DCI is greater than a maximum first quantity of CCEs.

13. The terminal side device according to claim 8, wherein:
when a first PDCCH candidate in the H PDCCH candidates and a second PDCCH candidate in L PDCCH candidates meet the second condition, the first PDCCH candidate and the second PDCCH candidate correspond to one time of monitoring; or
when a first PDCCH candidate in the H PDCCH candidates and a second PDCCH candidate in L PDCCH candidates do not meet the second condition,
the first PDCCH candidate and the second PDCCH candidate correspond to two times of monitoring;
the first PDCCH candidate is any one of the H PDCCH candidates, the second PDCCH candidate is any one of the L PDCCH candidates, and L is an integer greater than 0; and
the L PDCCH candidates comprise a PDCCH candidate in the H PDCCH candidates except the first PDCCH candidate, and comprise PDCCH candidates that are located in the first time unit and that are in all search space sets whose priorities are less than the search space set corresponding to the first DCI; and
the remaining maximum quantity of times of monitoring is equal to a difference between a maximum second quantity of times of monitoring and a sum of quantities of times of monitoring that are corresponding to all search space sets whose priorities are greater than the search space set corresponding to the first DCI.

14. The terminal side device according to claim 13, wherein the operations comprise:
when determining that the third quantity of times of monitoring is greater than the remaining maximum quantity of times of monitoring, ignoring, by the terminal side device, the search space set corresponding to the first DCI.

15. A network side device, comprising:
at least one processor; and
one or more memories coupled to the at least one processor and storing instructions for execution by the at least one processor to perform operations comprising:
generating first downlink control information (DCI) that meets a first condition, wherein a quantity of physical downlink control channel (PDCCH) candidates that are located in a first time unit and that are in a search space set corresponding to the first DCI is equal to a first quantity of times of monitoring performed by a terminal side device on a PDCCH carrying the first DCI in the first time unit, wherein the first quantity of times of monitoring is less than or equal to a maximum first quantity of times of monitoring, and wherein the first condition comprises one or more of the following:
the search space set corresponding to the first DCI has more than one monitoring occasion in preset duration;
the search space set corresponding to the first DCI has more than one monitoring occasion in preset duration, a control resource associated with the search space set corresponding to the first DCI is distributed in P symbols in the preset duration, and the first DCI does not overlap, in Q of the P symbols, control resources associated with search space sets corresponding to all other DCI of the terminal side device, wherein P is an integer greater than 0, and Q is less than or equal to P; or
the first DCI is a specified DCI;
sending a first instruction to the terminal side device before generating the first DCI, wherein the first instruction is used to instruct the terminal side device to use a quantity of PDCCH candidates comprised in a search space set corresponding to to-be-received DCI as a quantity of times of monitoring performed on a PDCCH carrying the DCI; and
sending the first DCI on the PDCCH.

16. The network side device according to claim 15, wherein a quantity of non-overlapping control channel elements (CCEs) used by the terminal side device to perform channel estimation on the PDCCH carrying the first DCI is less than or equal to a maximum first quantity of CCEs.

* * * * *